(12) United States Patent
Perelli-Minetti et al.

(10) Patent No.: US 12,219,193 B1
(45) Date of Patent: Feb. 4, 2025

(54) PERSONALIZED ARTIST DATA WITH CURATED ACTION ITEMS

(71) Applicant: Block, Inc., San Francisco, CA (US)

(72) Inventors: Linnea Perelli-Minetti, Seattle, WA (US); Kara Lee, New York, NY (US)

(73) Assignee: Block, Inc., San Francisco, CA (US)

( * ) Notice: Subject to any disclaimer, the term of this patent is extended or adjusted under 35 U.S.C. 154(b) by 31 days.

(21) Appl. No.: 18/214,957

(22) Filed: Jun. 27, 2023

(51) Int. Cl.
*H04N 21/258* (2011.01)
*G06Q 10/02* (2012.01)
*G06Q 30/0201* (2023.01)

(52) U.S. Cl.
CPC ....... *H04N 21/25891* (2013.01); *G06Q 10/02* (2013.01); *G06Q 30/0201* (2013.01); *H04N 21/25875* (2013.01); *H04N 21/25883* (2013.01)

(58) Field of Classification Search
CPC ....... H04N 21/25891; H04N 21/25875; H04N 21/25883; G06Q 10/02; G06Q 30/0201
See application file for complete search history.

(56) References Cited

U.S. PATENT DOCUMENTS

| | | | | |
|---|---|---|---|---|
| 2009/0024488 | A1* | 1/2009 | Romley | G06Q 10/10 705/27.1 |
| 2013/0325525 | A1* | 12/2013 | Boyd, Jr. | G06Q 30/0641 705/5 |
| 2014/0359647 | A1* | 12/2014 | Shoemake | H04N 21/6582 725/10 |
| 2015/0332384 | A1* | 11/2015 | Garcia | G06Q 30/0641 705/27.1 |

* cited by examiner

*Primary Examiner* — Mulugeta Mengesha
(74) *Attorney, Agent, or Firm* — FIG. 1 Patents

(57) ABSTRACT

A recommendation system is described, which is configured to generate and output a recommendation for an artist, an artist's authorized agent, or combinations thereof, regarding an action to perform for increasing consumption of media content items associated with the artist. In implementations, consumption of one or more media content items associated with an artist is monitored. Based on the monitored consumption, the artist is assigned to an artist segment. Recommendations are then generated for the artist based on artist data for the artist as well as historical data associated with different artists that are included in the same artist segment or that were previously associated with the same artist segment. A user interface is generated to display information describing data associated with the artist and present controls that are selectable to initiate performance of a recommended action.

20 Claims, 12 Drawing Sheets

PERSONALIZED ARTIST DATA WITH CURATED ACTION ITEMS

TECHNICAL FIELD

Media content platforms can be implemented as dedicated applications as well as web pages and enable artists and labels to upload music or videos for subsequent streaming by users who visit and/or subscribe to the media content platform. Media content platforms monitor and record data describing one or more entities associated with individual media content items, such as profile data describing an entity, audience data describing how users of the media content platforms access or otherwise interact with media content items, and so forth. Data describing an entity is accessible by the entity via one or more interfaces of a media content platform.

DETAILED DESCRIPTION

Figure 1:
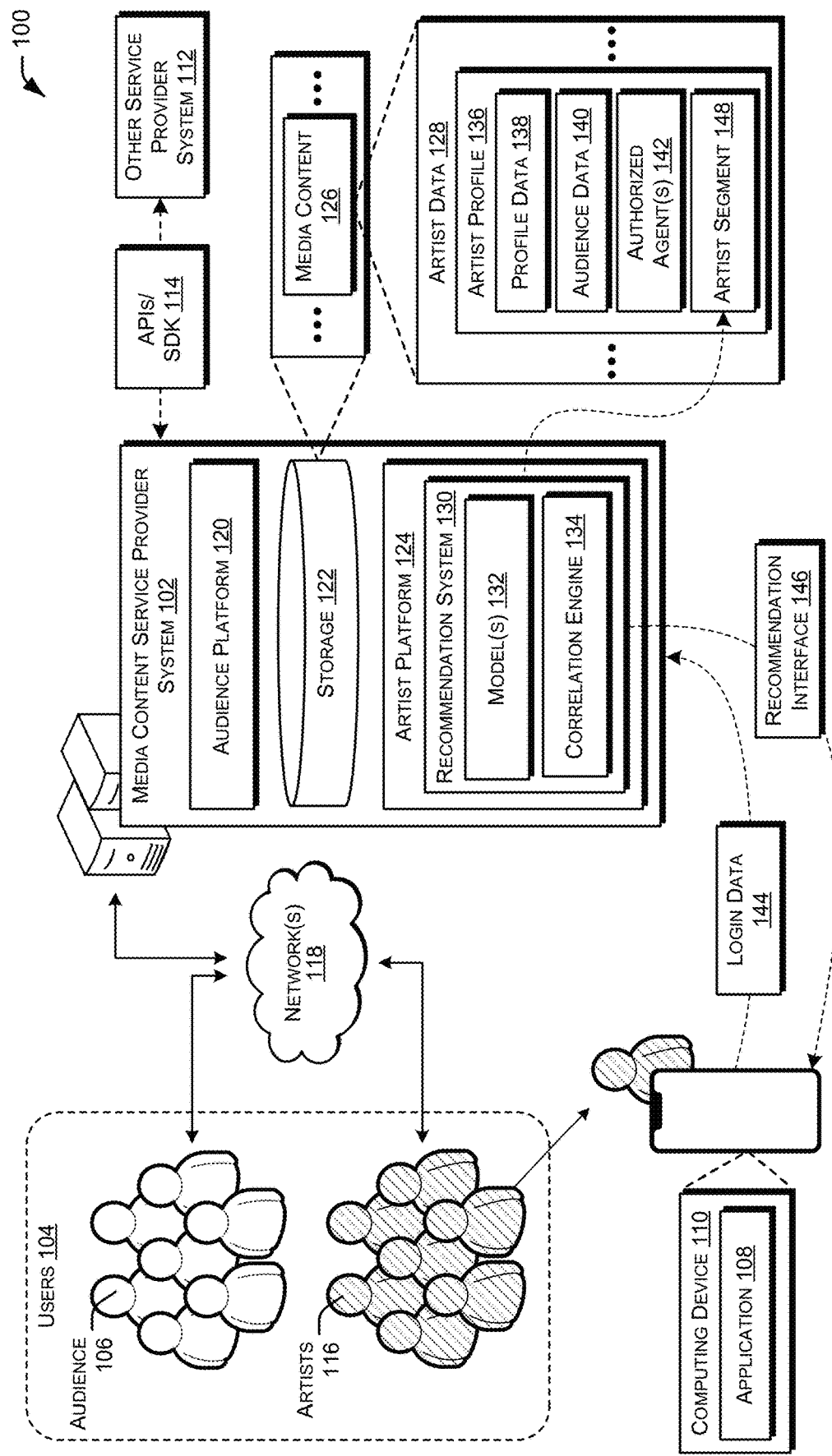
FIG. 1 is a block diagram of a non-limiting example environment for generating a recommendation interface for an artist based on artist data associated with the artist and optionally artist data associated with one or more different artists in accordance with implementations described herein.

Methods and systems for automatically generating a recommendation for an artist to perform one or more actions in furtherance of a defined objective are described herein. Artists create content in a variety of forms, such as images, music, videos, written word, and so forth, which is then consumed (e.g., viewed or listened to) by users, such as by fans. Data describing how users consume an artist's content is incredibly valuable to the artist, as the data enables artists to effectively engage with their fanbase.

In conventional systems, users access artists' content via a service provider platform that collects data describing how users consume individual instances of content (e.g., track listener demographics for a particular song or album). Conventional service provider platforms, however, present only a limited amount of collected data for viewing by an artist and do not offer a mechanism for exporting artist data from the platform.

Consequently, artists and their authorized agents (e.g., managers, tour booking agents, PR firms, merchandisers, etc.) are forced to manually sift through this data and leverage personal knowledge or past experience to develop a plan for acting on the data (e.g., scheduling a tour route, developing/implementing an ad campaign, order merchandise, etc.). Further, conventional service provider platforms retain ownership of fan data and do not allow artists to export fan data as being owned by the artists, or to supplement the fan data with data from external sources (e.g., different service provider platforms). When artists utilizing conventional systems do not have control over their own data, the data is subject to distribution at the discretion of the service provider platforms and presents security risks to the artist and the associated data.

Although generic artist guidance is provided by some conventional systems (e.g., for deploying marketing campaigns, for purchasing merchandise, etc.), this generic information is not tailored to a specific artist and fails to account for listener data that defines how users are listening to the specific artist. Accordingly, conventional systems force artists to perform numerous searches to compile a sufficient amount of generic guidance to make determinations on various aspects of an artist's pursuits, resulting in significant data transmission and storage to locate and compile such information. Even after locating and compiling the generic information, the generic advice is ineffective in connecting artists with actual listeners.

Further, conventional systems force artists to store data from numerous digital content platforms (e.g., DSPs), team members, merchandisers, venues, advertising agencies, social media platforms, and so forth, in platforms associated with these respective entities, which is often duplicative. To consolidate such data in one place, such as to obtain an overview of the artist's listeners overall, increased storage and processing resources of a computing system are required by conventional systems that silo data based on the source or platform. Therefore, generating a recommendation for "what the artist should do next" based on data distributed over numerous siloed platforms involves download of such data, data duplication, and selective data upload if information is to be transferred among systems, thus resulting in significant storage requirements and network transmission.

To address these challenges facing conventional systems, a media content service provider system collects, stores, and presents artists with their own data (e.g., data describing actions performed by an artist, data describing a profile for the artist, data describing an audience's consumption of media content items associated with the artist, and so forth). In implementations, the media content service provider system is configured to selectively release artist data in a manner that ensures data is released to artists and their authorized agents, and released to the authorized agents to an extent permitted by an artist associated with the data. Advantageously, the techniques described herein present artist data in a curated manner that is specifically tailored to the artist, or a goal defined for a role associated with an authorized agent of the artist, based on trends identified in artist data, on data satisfying threshold metrics, or combinations thereof.

In implementations, the media content service provider system hosts media content items created by, or otherwise associated with, an artist. The media content service provider system monitors consumption (e.g., views, listens, streams, etc.) of individual media content items and tracks respective data points for each media content item (e.g., for musical media content items—listener demographics, number of unique listeners, listener geolocation, etc.). Based on these tracked data points, the media content service provider system identifies trends in consumption of media content items for a given artist.

The monitored data, identified trends, and other analytics are displayed to the artist via a user interface of the media content service provider system. In implementations, the user interface is configured as a recommendation user interface that includes controls for customizing a manner in which the data is presented. Example controls are useable to scope down and view data monitored over a particular time window (e.g., past month, past year, etc.), data observed from a particular geolocation (e.g., data for fans located in Canada), data observed for a defined demographic group (e.g., data for 24-year-old women), combinations thereof, and so forth.

The media content service provider system provides data (e.g., via display in the recommendation user interface, via export to a third-party, or for download at a device) curated based on the role of an entity accessing the data and access controls provided to the entity. To do so, credentials are assigned to individual artists and authorized agents, which allows the media content service provider system to control access to collected data and curate data based on a role associated with the particular entity accessing user (e.g., fan) data. Individual roles can be associated with defined goals or objectives, and data is parsed and presented for the specific role. For instance, managers of multiple artists are provided with a dashboard of artist-specific metrics and tasks that need to be completed for each artist (e.g., where tasks are recommended based on the artist-specific metrics). Booking agents are provided with a dashboard of tour stop recommendations derived from fan data for a particular artist, thus reducing communications that the booking agent has to make. Merchandisers are provided with a dashboard that recommends merchandise inventory orders based on artist fan data, such as tied to a specific location based on where fans are located. Public relations specialists are provided with recommended ad campaigns based on the data based on locations of listeners determined from aggregated current geolocation and listening data of mobile devices.

In some instances, data is presented in the recommendation user interface provided by the media content service provider system based on a set of heuristics that are associated with artist segments defining a collection of artists sharing one or more characteristics. Data useable to define different artist segments is aggregated automatically from multiple sources, such as via an API with various other platforms and without additional user interaction. For instance, a rising artist (e.g., an artist with a threshold number of streams) is presented with one or more recommendations for achieving a desired objective based on data describing historical results associated with similar artists (e.g., other artists assigned to a rising artist segment) performing the recommended action. Recommended actions are also presented based on the artist's specific data and/or based on a segment associated with the artist (e.g., unknown artist, rising artist, icon, etc.).

Recommendations presented in the UI include third-party tools or platforms that are useable to take action based on insights identified from user data. For instance, controls are presented to initiate performance of a recommended action, such as to place a recommended merchandise order for a trending demographic (e.g., by automatically populating a shopping cart with recommended merchandise), establishing a communication channel with one or more recommended concert venues to book a performance, and so forth. The media content service provider system is further configured to monitor input at the recommendation user interface to identify when recommended actions are performed, which is used to further train one or more machine learning models that generate the recommendations in an ongoing manner that adapts to observed changes and trends in artist data.

Advantageously, the systems and techniques described herein are thus configured to present artist data in a curated manner that is tailored to a defined objective associated with an artist or an artist's authorized agent. The systems and techniques described herein are further configured to automatically generate recommendations for achieving the defined objective that are tailored based on observed data associated with an artist for whom the recommendation is generated, as well as historical data describing observed results for similar artists, which is not possible using conventional systems. As further advantages relative to conventional approaches, the systems and techniques described herein enable an artist to view curated artist data from a single source rather than, for instance, accessing a first database to obtain tour booking data, accessing a second database to obtain merchandising data, accessing a third database to obtain media content consumption data, accessing a fourth database to obtain publication data, and so forth. As yet another advantage, the systems and techniques described herein provide improved data security by maintaining artist data in a single location that is controllable by the artist, rather than being siloed in various third-party platforms that permit the third-party platforms to distribute or otherwise use artist data at their own discretion (e.g., without approval by the associated artist).

The preceding description is provided for the purposes of summarizing some example implementations to provide a basic understanding of aspects of the subject matter described herein. Accordingly, the above-described features are merely examples and are not limiting in any way. Other features, aspects, and advantages of the subject matter described herein will become apparent from the following description of the figures and claims.

FIG. 1 is a block diagram of a non-limiting example environment 100 for generating a recommendation for an artist regarding an action to perform for increasing consumption of media content items associated with the artist and outputting a recommendation interface that displays the recommendation and includes a selectable control to initiate performance of the recommended action. In one implementation, the environment 100 includes a media content service provider system 102 and a population of users 104 of the media content service provider system 102. In implementations, the media content service provider system 102 is a music service provider system that, at least in part, provides media items (e.g., by streaming media such as by streaming music, streaming video, combinations thereof, and so forth) to an audience 106 comprised of at least one of the users 104. In implementations, for instance, the media content service provider system 102 is, or includes, an application 108.

As an example, the media content service provider system 102 is, or includes, a subscription-based digital media streaming application, which executes on a computing device (e.g., a mobile phone or other computing device) with media items stored on a remote server, such as on a server implementing and/or associated with the media content service provider system 102. In this manner, media items provided by the media content service provider system 102 (e.g., via application 108) are either streamed offline (e.g., cached locally on computing device executing the application 108, such as computing device 110) or streamed online with content streaming in packets.

Hence, the media content service provider system 102 is representative of a digital audio streaming service (e.g., for music and/or podcasts), a digital video streaming service, or a streaming service that provides streaming of various different types of digital media or multimedia. In some implementations, such a streaming service is subscription-based, so as to allow the users 104 to stream digital media items (e.g., songs, podcasts, videos, combinations thereof, and so forth) on-demand from a centralized library provided by the media content service provider system 102.

Alternatively or additionally, the application 108 of the media content service provider system 102 is configured to provide access to functionality provided by at least one other service provider system 112 (e.g., at least one service provider system other than the media content service provider system 102). The service provider system 112, for instance, is representative of a system that is or deploys at least one application, such as a media streaming application, a lending application, a payment application, an appointment application, a loyalty application, a social media application, combinations thereof, and so forth. In implementations, the service provider system 112 is communicatively coupled to the application 108 via dedicated application programming interfaces (APIs) and/or software development kits (SDKs) 114 (referred to hereinafter as "APIs/SDKs 114"). In some implementations, the service provider system 112 is representative as a source of media items, such as a source of media items that are provided to users 104 via the media content service provider system 102. For instance, in an example scenario the service provider system 112 is representative of a music label that provides media content to the media content service provider system 102 in the forms of songs, albums, and so forth. Alternatively or additionally, the service provider system 112 is representative of an artist, a distributor, or the like which provides media content to the media content service provider system 102 without a music label as an intermediary (e.g., by uploading the media content via an application installed on a client device).

The users 104 access the media content service provider system 102 via one or more computing devices, which are each configured to execute the application 108. In at least one implementation, individual ones of the users 104 are registered via one or more user accounts with the media content service provider system 102. Alternatively or additionally, one or more of the users 104 access media content via the media content service provider system 102 independent of (e.g., without) signing up for a user account or otherwise registering via an account or profile with the media content service provider system 102. In at least some scenarios where one or more of the users 104 have not registered with the media content service provider system 102 via a user account, user profile, or the like, such users are referred to as "unregistered users." In some implementations, unregistered users are permitted to access media content from the media content service provider system 102 in a provisional manner (e.g., access media content in under time-restricted conditions, such as being able to preview 30 seconds of audio content).

In accordance with the described techniques, one or more of the users 104 are designated by the media content service provider system 102 as "artists," thus forming a population of users that are artists 116. In one or more implementations, the media content service provider system 102 provides the "artist" designation to users that have provided digital evidence that those users generate media content for the media content service provider system 102, for other service providers, for live performances, and/or for exposure to an audience in various ways. In one or more implementations, the media content service provider system 102 activates the "artist" designation for a user 104 by updating data (e.g., one or more fields) in user data maintained by the media content service provider system 102 in association with the user 104.

For instance, in an example implementation media content is received by the media content service provider system 102 from service provider system 112 with data indicating that the media content is associated with (e.g., generated by or attributed to) one or more of the users 104. In such an example implementation, the media content service provider system 102 updates user data for the one or more of the users 104 to indicate that the one or more of the users 104 is an "artist" of the media content, and thus designated as an artist 116 of the users 104.

Individual ones of the users 104 are depicted as being associated with a respective computing device (e.g., computing device 110), representing how the user 104 accesses media content and functionality provided by the media content service provider system 102. For instance, the computing device 110 is depicted as including the application 108. By enabling user interaction with one or more user interfaces of the application 108, the computing device 110 provides the user 104 access to various functionalities of the media content service provider system 102. Although the computing device 110 is illustrated with respect to being associated with a user included in the population of the artists 116, in some implementations a user included in the population of the audience 106 is also included in the artists 116. For instance, in an example scenario where a user 104 in the population of artists 116 uses the application 108 to consume media content created by themselves, by one or more other artists of the population of artists 116, or a combination thereof, the user 104 in the population of artists is similarly represented as being in the population of the audience 106. The computing device 110 connects the user to the media content service provider system 102 via one or more network(s) 118, one example of which is the Internet.

Computing devices that operate in the context of environment 100 (e.g., computing device 110) are configurable in a variety of manners. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described below in relation to FIGS. 13 and 14.

The media content service provider system 102 is depicted as including audience platform 120, storage 122, and artist platform 124. The storage 122 is depicted as storing media content 126 and metadata with one or more items of media content 126, such as artist data 128. The storage 122 is configurable in a variety of manners to store data. For instance, the storage 122 is configured to include or otherwise access one or more databases, virtual storage, combinations thereof, and so forth. Alternatively or additionally, the storage 122 includes one or more data tables, data stores, combinations thereof, and so forth, which are configured as being physically or logically separated (e.g., physically remote from one another and/or partitioned to store different data in different storage partitions). The artist platform 124 is depicted as including a recommendation system 130 having one or more model(s) 132 and a correlation engine 134.

In implementations, individual artists of the population of artists 116 have an artist profile 136 in the artist data 128. The artist data 128 is depicted with ellipses to indicate that the artist data 128 includes multiple artist profiles 136 (e.g., an artist profile for an individual artist of the population of artists 116). However, for purposes of simplicity, the illustrated example of FIG. 1 depicts the artist data 128 as metadata for the media content 126 that describes a single artist associated with the media content 126. Further, although illustrated in the context of being metadata associated with media content 126, the artist data 128 is representative of data maintained in the storage 122 independent of an association with, or connection to, one or more items of media content 126. Although described herein in the context of representing a single artist of the population of artists 116, an artist profile 136 of the artist data 128 is representative of a group of multiple artists of the population of artists 116. For instance, in an example scenario a group of multiple artists or team members that form a band is represented using a single artist profile 136. As another example, a group of multiple bands, a set of individual performers, and so forth that are associated with an entity (e.g., a common music label) are represented by a single artist profile 136 in the artist data 128.

In some implementations, the artist platform 124 enables users 104 that represent individual artists of the population of artists 116, band or team members (e.g., one or more selected, permissioned members) of a band or team to create, modify, update, or edit profile data 138 for their artist profile 136. Accordingly, in one or more implementations, the artist platform 124 provides one or more user interface instrumentalities that enable an artist of the population of artists 116 to edit profile data 138 included in an artist profile 136 of the artist data 128. As an example, the artist platform 124 provides a user interface instrumentality to confirm that media content 126 is correctly associated with profile data 138 for the artist. As another example, the artist platform 124 provides a user interface instrumentality to specify one or more actions taken by one of the artists 116 (e.g., a single released by the artist, an album released by the artist, a concert scheduled or held by the artist, a public appearance by the artist, a collaboration by the artist with one or more other artists, and other information describing actions performed by an artist associated with the artist profile 136.

In some implementations, the artist platform 124 is configured to update profile data 138 for an artist profile 136 automatically (e.g., independent of user input to a user interface instrumentality of the artist platform 124) based on information collected by the artist platform 124. For instance, the artist platform 124 is configured to automatically scrape data from one or more sources (e.g., via the network(s) 118) describing activities performed by, or information associated with, the artists 116. For instance, the artist platform 124 monitors one or more ticketing services to automatically identify ticket sales for an artist's concert or public performance and updates the profile data 138 to include information describing ticket sales. As another example, the artist platform 124 monitors one or more merchandise sales platforms and updates the profile data 138 to include information describing past merchandise sales associated with an artist. As yet another example, the artist platform 124 monitors one or more news services and updates the profile data 138 to reflect press releases, news articles, social media comments, and/or other mentions of an artist in publications.

The profile data 138 is thus representative of information that identifies a respective artist of the population of artists 116 at the media content service provider system 102 and includes information describing characteristics of the artist and actions attributed to the artist. The profile data 138 for an artist, for instance, includes information such as an artist name, a title, a genre, a style, a description, a biography, one or more images, one or more videos, sample media content (e.g., music), a status, a profile theme (e.g., colors), visual data (e.g., music album cover art), associated equipment and/or instruments (e.g., vocals, guitar, drums, flute, violin, compressed air machine, laser machine, DJ controller type or functional capabilities, preferred mixing software, etc.), combinations thereof, and so forth. These examples of information included in profile data 138 are exemplary and not limiting, such that the profile data 138 is representative of any information attributable to an artist in the population of artists 116.

In implementations, the profile data 138 is specified by a respective artist of the population of artists 116. For instance, the profile data 138 is provided to the media content service provider system 102 by a manager, band member, or other artist-authorized agent having access with edit permissions to the artist profile 136 for an artist on the media content service provider system 102. As an example, the profile data 138 is provided to the media content service provider system 102 as part of setting up the artist profile or as part of modifying the artist profile 136 after setup. Alternatively or additionally, the profile data 138 is provided to the media content service provider system 102 as being associated with media content 126 by a source from which the media content 126 is received.

For instance, the media content service provider system 102 receives media content 126 from the other service provider system 112, together with profile data 138 describing an artist associated with the media content 126. As a specific example, media content 126 represents a song, an album of multiple songs, or a discography of multiple albums for an artist and is received by the media content service provider system 102 from a music label (i.e., a "label") associated with the artist. In this specific example, the label provides the media content 126 to the media content service provider system 102 along with information describing the artist, such as profile data 138.

Alternatively or additionally, the profile data 138 is attributed to a respective artist of the population of artists 116 automatically by the media content service provider system 102. Examples of the profile data 138 attributed to the artist profile 136 by the media content service provider system 102 (or other sources) include, but are not limited to, a status of the artist (e.g., as a "famous" person or unlocked based on various performance measures), awards won by the artist, and so on. In one or more implementations, the media content service provider system 102 automatically determines and populates the profile data 138 with information describing one or more of artist name(s), title, genre, style, description, biography, images, videos, sample media content (e.g., music), status, profile theme (e.g., colors), and so forth. In such implementations, the media content service provider system 102 is configured to determine such information automatically (e.g., by scraping data from service provider system 112 and/or another source of information about the artist), populate an initial profile with the information, and enable a user to provide user input (e.g., via computing device 110) to update at least some of the profile data 138.

In addition to profile data 138, the artist profile is depicted as including information describing audience data 140 for an artist. The audience data 140 is representative of information describing one or more users 104 (e.g., information describing at least one aspect of the one or more users 104) that consume media content 126 associated with the artist profile 136. As described herein, users that consume the media content 126 associated with an artist profile 136 represent an audience 106 of a respective artist, or entity representing multiple artists, as identified by the artist profile 136. For instance, in an example scenario where the media content 126 is representative of music, audience data 140 is representative of "listener data" for an entity (e.g., one or more of the users 104) that listen to the music.

In one or more implementations, the audience data 140 is representative of a social graph that includes nodes representing users 104 (e.g., nodes that represent individual artists of the population of artists 116 and nodes that represent individual "listeners" of the audience 106). In implementations where the audience data 140 represents a social graph, the social graph includes edges that connect the nodes representing users of the audience 106 to nodes that represent users of the artists 116 (e.g., by establishing a node between a listener and an artist when the listener consumes media content 126 affiliated with the artist). Alternatively or additionally, the social graph of the audience data 140 includes edges that connect users of the audience 106 with individual ones of the population of artists 116 representing one or more digital interactions between an audience member and an artist.

In some implementations, edges of a social graph included in the audience data 140 are weighted to further describe a relationship between an artist and a user of the audience 106 for the artist. For instance, edges are weighted based on media content consumption metrics such as a number of times an item of media content 126 is consumed by a user 104, an amount of consumption, a quantity of digital interactions (e.g., likes, comments, or shares), a quantity of public performances (e.g., concerts) attended or viewed by a user 104, merchandise purchased by a user 104, and so forth. As such, the audience data 140 is representative of a social graph where a node representing a listener (e.g., of music) is connected to numerous nodes that represent different musical artists listened to by the listener. In a similar manner, a node representing a musical artist is connected to numerous nodes that represent different users who have listened to the musical artist's media content 126 or otherwise digitally interacted with the musical artist.

In some implementations, edges connecting a node representing one of the artists 116 and a node representing a user 104 in the audience 106 specify a relationship between the user and the artist as being "active" or "passive." As described herein, an "active" edge corresponds to a member of the audience 106 that affirmatively sought out a media content 126 item associated with the artist for consumption via the media content service provider system 102 (e.g., searched for the media content item, searched for the artist, etc.). Alternatively, a "passive" edge corresponds to a member of the audience 106 that did not affirmatively seek out the media content 126 or the artist associated with the media content 126. For instance, a passive edge is created when a member of the audience 106 consumes a media content 126 item (e.g., listens to a song) associated with the artist by playing a playlist generated by the media content service provider system 102 that includes the media content 126 associated with the artist but was not selected or curated for inclusion in the playlist by the user 104 connected to the artist by the passive edge. In this manner, the audience data 140 includes information describing both individual users 104 of the audience 106 that consume a media content 126 item, as well as a manner in which the individual users 104 consumed the media content 126 item.

In some implementations, the audience data 140 includes information describing demographics of the audience 106 that consumes media content 126 affiliated with the artist profile 136. Example demographics include, and are not limited to, age, location (e.g., current, residence, birth, etc.), annual income, purchase history, specified preferences (e.g., for music genres), determined preferences (e.g., based on monitoring actual listening behavior), social media behavior, gender, sexual orientation, combinations thereof, and so forth. Alternatively or additionally, the audience data 140 describes consumption metrics for media content 126 associated with an artist profile 136. For instance, in some implementations audience data 140 describes a number of times an item of media content 126 is consumed (e.g., viewed or listened to) by an individual user 104 of the audience 106, by the entire audience 106, or by at least one segment of the audience 106.

In some implementations, consumption metrics described by the audience data 140 are constrained to a period of time, such as all-time metrics or metrics for the past year, the past month, the past week, yesterday, today, and so forth. Other examples of consumption metrics described by the audience data 140 include a frequency at which an item of media content 126 is consumed (e.g., per user, per segment of the audience 106, per the entire audience 106), changes to historical consumption metrics over time for one or more items of media content 126, a relative popularity of the artist among at least one segment of the audience 106, combinations thereof, and so forth.

The audience data 140 is further representative of collaboration information for an artist profile 136, which includes data describing past collaborations between an artist or entity represented by the artist profile 136 and at least one other artist profile included in the artist data 128. Collaboration information is represented, for instance, based on credits (e.g., as specified in metadata) associated with a media content 126 item describing collaboration by two or more entities to create the media content 126 item.

In some implementations, in order for one or more of the users 104 to become designated as one or more of the artists 116 with the media content service provider system 102, the user onboards or "registers" with the media content service provider system 102. Registration for becoming an artist of the population of artists 116, for instance, involves one or more of the users 104 providing registration data to the media content service provider system 102. In some implementations, the registration data is representative of information describing profile data 138 to be included in an artist profile 136 for the artist on the media content service provider system 102. The media content service provider system 102 is configured to limit which of the users 104 are qualified for designation as one or more artists of the population of artists 116 based at least in part on artist registration data. For example, the media content service provider system 102 is configured to permit or deny one or more of the users 104 permission to access artist data 128 for an artist via the artist platform 124.

In some implementations, one or more of the users 104 are registered as one of the artists 116 or as an authorized agent of one or more artists 116 via registration data provided to the media content service provider system 102. In such implementations, an artist profile 136 includes information describing one or more authorized agents 142 associated with a corresponding one of the artists 116. In some implementations, individual ones of the authorized agents 142 are each associated with a defined role (e.g., a manager for one or more of the artists 116, a merchandising expert for an artist, a tour manager, a booking agent, a publicist, and so forth). Each of the authorized agents 142 are further assigned credentials (e.g., a username and a password, a verified decentralized identifier, etc.) that are useable by the artist platform 124 to validate when a user is authorized by one of the artists 116 to access artist data 128 for the artist.

In some implementations, the media content service provider system 102 includes an access control system (not depicted) to assist in user identity verification. For instance, an access control system of the media content service provider system 102 is useable to confirm that a user 104 attempting to access artist data 128 from the artist platform 124 is both who the user 104 purports to be, as well as confirm that the user is authorized by an artist associated with the artist profile 136 to access the artist data 128. Verifying an identity of a user 104 is performable in a variety of manners, such as using login data 144 that includes verifiable credentials assigned to an artist identified by the artist profile 136 or verifiable credentials assigned to one or more authorized agents 142 associated with the artist profile 136. Alternatively or additionally, verifying an identity of a user 104 is performed using identifiable information in the form of social media accounts, email addresses, biometric information, and other personally identifying data. In implementations where the login data 144, or other request to access information included in an artist profile 136 of the artist data 128, is verified by the media content service provider system 102, the media content service provider system 102 grants access to view, update, and/or export an authorized subset of the artist data 128.

In the context of authorizing one or more of the users 104 to access the artist platform 124 as one of the artists 116, the media content service provider system 102 is configured to allow one or more of the users 104 to be designated as an artist 116 conditioned on one or more acceptance criteria, such as based on artist permissions to be included in the artist platform 124 and for one or more items of media content 126 to be provided via the audience platform 120. Other examples of acceptance criteria involved in designating an artist 116 in the artist platform 124 include, without limitation, criteria based on evaluating one or more samples of media content 126 associated with the user(s), based on confirmation by a music label or copyright owner of the media content 126 associated with the user(s), and so forth. The media content service provider system 102 is further configured to condition verification of one or more authorized agents 142 based on acceptance criteria, such as based on confirmation by a public relations firm that a publicist is who they purport to be and an authorized representative of an artist associated with an artist profile 136.

In some cases, verification of an authorized agent may utilize a verifiable credential system (e.g., as part of a decentralized network), in which the media content service provider system 102 is a credential verifier, the artist is an issuer of the verified credential, and the authorized agent(s) 142 are the holders of credentials. An authorized agent 142 presents a verified credential issued by the artist that identifies a role of the authorized agent (e.g., publicist) to the media content service provider system 102. Upon receipt of the verified credential, the media content service provider system 102 may generate access controls based on the role indicated in the verifiable credential by the artist for the authorized agent 142 (e.g., without additional user intervention).

In implementations, the media content service provider system 102 is configured to grant one or more users 104 that meet criteria for becoming an artist 116, or an authorized agent 142 of an artist 116, permission to access at least at portion of functionality provided by the artist platform 124. For instance, in some implementations lesser-known artists and their authorized agents are granted permission to access a subset of the total functionalities of the artist platform 124, while well-known artists and their authorized agents are granted permission to access all of the total functionalities or a subset with more of the total functionalities. Alternatively or additionally, some functionality of the artist platform 124 is withheld from an artist 116 and their authorized agents until the artist satisfies one or more threshold criteria to unlock a larger number of artist platform 124 functionalities.

The locking and unlocking of functionalities translates into making parts of those functionalities visible or invisible (or visible but with a locked status and indicating specific steps that the artist needs to take to unlock) via a graphical user interface of the media content service provider system 102, such as graphical user interface functionalities described in further detail below. For instance, certain artists may be restricted from accessing functionality of the media content service provider system 102 to indicate whether media content 126 provided via the audience platform 120 is correctly attributed to an artist profile 136 for an artist 116. In some implementations, an artist is permitted to provide specific data, such as identity verification data, concert date and/or ticket information, performance videos, and so on, to unlock functionality or access to the artist platform 124.

In implementations where the media content service provider system 102 identifies that a user purporting to be one of the artists 116 is not "who they say they are," the media content service provider system 102 is configured to deny the user designation as an artist, deny the user designation as an authorized agent for an artist, deny the user access to artist data 128 associated with an artist, or combinations thereof. In some implementations, the media content service provider system 102 is configured to notify a person or entity represented by one of the artists 116 that an imposter is attempting to register as the artist on the media content service provider system 102 and/or access artist data 128 associated with the artist on the media content service provider system 102. The media content service provider system 102 is thus configured to advantageously prevent fraud, intellectual property infringement (or theft), security vulnerabilities, and the like, which might result from incorrectly registering a user as an artist 116 or an authorized agent 142 of an artist. The media content service provider system 102 is configured to provide such notification in a variety of manners, such as via email, phone, social media messaging, text, and so forth.

In implementations where the media content service provider system 102 determines that a user is who they purport to be and that the user is authorized to access artist data 128 for one or more of the artists 116, the media content service provider system 102 grants access to view the artist data 128. For instance, in response to receiving login data 144 as part of a request to access artist data 128, the media content service provider system 102 verifies that user credentials included in the login data 144 identify an artist 116 or an authorized agent 142 of the artist identified by the artist data 128. In response to verifying that the login data 144 is received from a user authorized by an artist to access the artist's artist data 128, the media content service provider system 102 grants access to the artist data 128. In some implementations, granting access to the artist data 128 includes outputting a display of a portion or entirety of the artist data 128 via a user interface of the media content service provider system 102. Alternatively or additionally, granting access to the artist data 128 includes exporting a portion or entirety of the artist data 128 to a third-party platform, such as to the other service provider system 112.

In some implementations, granting access to the artist data 128 includes outputting a recommendation generated by the recommendation system 130 for display in a recommendation interface 146. The recommendation interface 146, for instance, is output for display at a computing device 110 from which the login data 144 was received. In implementations, the recommendation interface 146 includes a recommendation for increasing consumption (e.g., by the audience 106) of a media content 126 item associated with an artist from whom the login data 144 is received. For instance, the recommendation interface 146 includes a recommendation to perform one or more actions that are predicted by the recommendation system 130 to increase consumption of a media content 126 item (e.g., for an instance of audio media content 126—increase a number of streams, a number of overall listeners, a number of new listeners, a number of active listeners, a number of passive listeners, combinations thereof, and so forth).

In some implementations, the recommendation system 130 generates the recommendation interface 146 to include one or more controls that are selectable to initiate performance of a recommended action. As an example, in response to predicting that scheduling a public appearance (e.g., a concert) will increase consumption of one or more media content 126 items associated with an artist 116 identified by the login data 144, the recommendation system 130 outputs a recommendation in the recommendation interface 146 to schedule a public appearance. In this example, the recommendation system 130 outputs the recommendation interface 146 with at least one control that is selectable to book a venue for a public performance, issue a press release or advertisement notifying the audience 106 of the public performance, and so forth.

In some implementations, the recommendation system 130 tailors a recommendation included in the recommendation interface 146 based on a role associated with a user from whom the login data 144 is received. As an example, in a scenario where the login data 144 identifies that an artist 116 is accessing their own artist data 128 via the media content service provider system 102, the recommendation system 130 generates a recommendation to perform one or more action items that are predicted to increase consumption of one or more media content 126 associated with the artist 116. As another example, in a scenario where the login data 144 identifies that a tour manager or booking agent is an authorized agent 142 of an artist 116 accessing the artist data 128 associated with the artist 116, the recommendation system 130 generates a recommendation for a tour route, venues to book at stops along the tour route, and so forth, which are predicted to be attended by members of the audience 106.

As another example, in a scenario where the login data 144 identifies that an advertising manager is an authorized agent 142 of an artist 116 accessing the artist data 128 associated with the artist 116, the recommendation system 130 generates a recommendation to publish digital video advertisement on a certain social media platform. In implementations, the recommendation generated by the recommendation system 130 is generated based on artist-specific data (e.g., the recommendation to publish the digital video advertisement on the certain social media platform is made based on data describing that advertisements for the artist are more successful on the certain social media platform, in contrast to one or more different social media platforms). As described in further detail below with respect to FIG. 2, the recommendation system 130 is configured to generate a recommendation based on artist data 128 associated with an artist 116, such as profile data 138 and audience data 140.

Additionally, the recommendation system 130 is configured to leverage artist data 128 associated with one or more different artists (e.g., artists 116 other than an artist for which the recommendation interface 146 is output). To do so, the artist platform 124 is configured to assign each artist 116 to an artist segment 148, where an artist segment 148 represents a category that groups similar artists based on one or more criteria. For instance, in one example scenario the artist platform 124 groups artists into an "Unknown" artist segment 148, a "Rising" artist segment 148, an "Established" artist segment 148, or an "Icon" artist segment 148. Example criteria for grouping artists into different segments include a threshold number of streams of media content 126 items associated with the artist, such that artists with fewer than 10,000 streams are assigned to the "Unknown" artist segment 148 and artists with 10,000-500,000 overall streams are assigned to the "Rising" artist segment 148. Continuing this example scenario, artists with more than 5,000,000 streams are assigned to the "Icon" artist segment 148, and artists with 500,000 to 5,000,000 streams are assigned to the "Established" artist segment 148. The artist platform 124 is configured to group artists 116 by artist segments 148 based on any suitable criteria or combination of criteria, and a granularity with which artists are assigned to different artist segments 148 is not limited to the four example segments described above. In examples, additional and/or different criteria may be used to group artists into segments, such as location, genre, revenue, collaborations, social media following, tour frequency and/or location, event ticket sales, merchandise sales, and so forth.

By grouping similar artists by artist segment 148, the recommendation system 130 is configured to leverage artist data 128 associated with different artists when outputting a recommendation via the recommendation interface 146. For instance, the recommendation system 130 implements the correlation engine 134 to identify artist data 128 of an artist for which a recommendation is being generated as well as artist data 128 of one or more artists that are similar to the artist for which the recommendation is being generated. As a specific example, the correlation engine 134 selects artist data 128 associated with different artists that are assigned to a common artist segment 148 with the artist for which the recommendation is being generated. Alternatively or additionally, the correlation engine 134 selects artist data 128 associated with different artists that were previously assigned to a common artist segment 148 with the artist for which the recommendation is being generated, and have since graduated or elevated to a different (e.g., more popular) artist segment 148. As a specific example, if the recommendation is being generated for an artist currently assigned to an "Unknown" artist segment 148, the correlation engine 134 selects artist data 128 for artists that were previously in the "Unknown" artist segment 148 and have risen to the "Rising" artist segment 148, such that the recommendation is generated based on data that describes how others achieved an increase in consumption of their media content 126 item(s).

Artist data 128 selected by the correlation engine 134 is then provided as input to the model(s) 132 of the recommendation system 130 for use in generating a recommendation presented in the recommendation interface 146. In implementations, the recommendation system 130 is configured to automatically (e.g., independent of user intervention) generate a recommendation using the one or more model(s) 132. The model(s) 132 are thus representative of one or more machine learning models trained to output a recommendation to perform an action that is predicted to provide a positive result for an entity identified by the login data (e.g., an increased consumption of a media content 126, increased merchandise sales, increased mentions in the news or social media, increased ticket sales, and so forth).

In implementations, the one or more model(s) 132 are trained to output a recommendation for an artist 116 or an artist's authorized agent 142 using ground truth training data. Ground truth data as described herein refers to one or more training pairs that each include a vector representation of artist data 128 and an observed result (e.g., a known result) for an artist 116 associated with the artist data 128. The vector representation included in a training pair is representative of data that describes any one or more subsets, or entirety, of information included in the artist data 128 and an observed result such as consumption metrics for media content 126 associated with the artist, ticket sales, merchandise revenue, combinations thereof, and so forth.

In some implementations, the one or more model(s) 132 are trained using negative training pairs, which each a vector representation of artist data 128 and an observed result that describes a negative outcome for an artist 116 associated with the artist data 128 (e.g., decreased consumption of media content 126). The ground truth training pairs and the negative training pairs are thus useable by the recommendation system 130 to train the one or more model(s) 132 to output a recommendation to perform an action that is predicted to have a positive result for an artist 116. Although described herein in the context of being separate sets of training pairs, in some implementations the ground truth data includes both positive training pairs (e.g., training pairs that include a vector representation of artist data 128 and a known positive result observed for the vector representation of the artist data 128) and negative training pairs. In some implementations, the one or more model(s) 132 are representative of one or more generative artificial intelligence models, such as generative adversarial network (GAN) models. Other example machine-learning mechanisms represented by the model(s) 132 include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, and so forth.

A description of the recommendation system 130 outputting a recommendation in a recommendation interface 146 is provided in further detail below.

Figure 2:
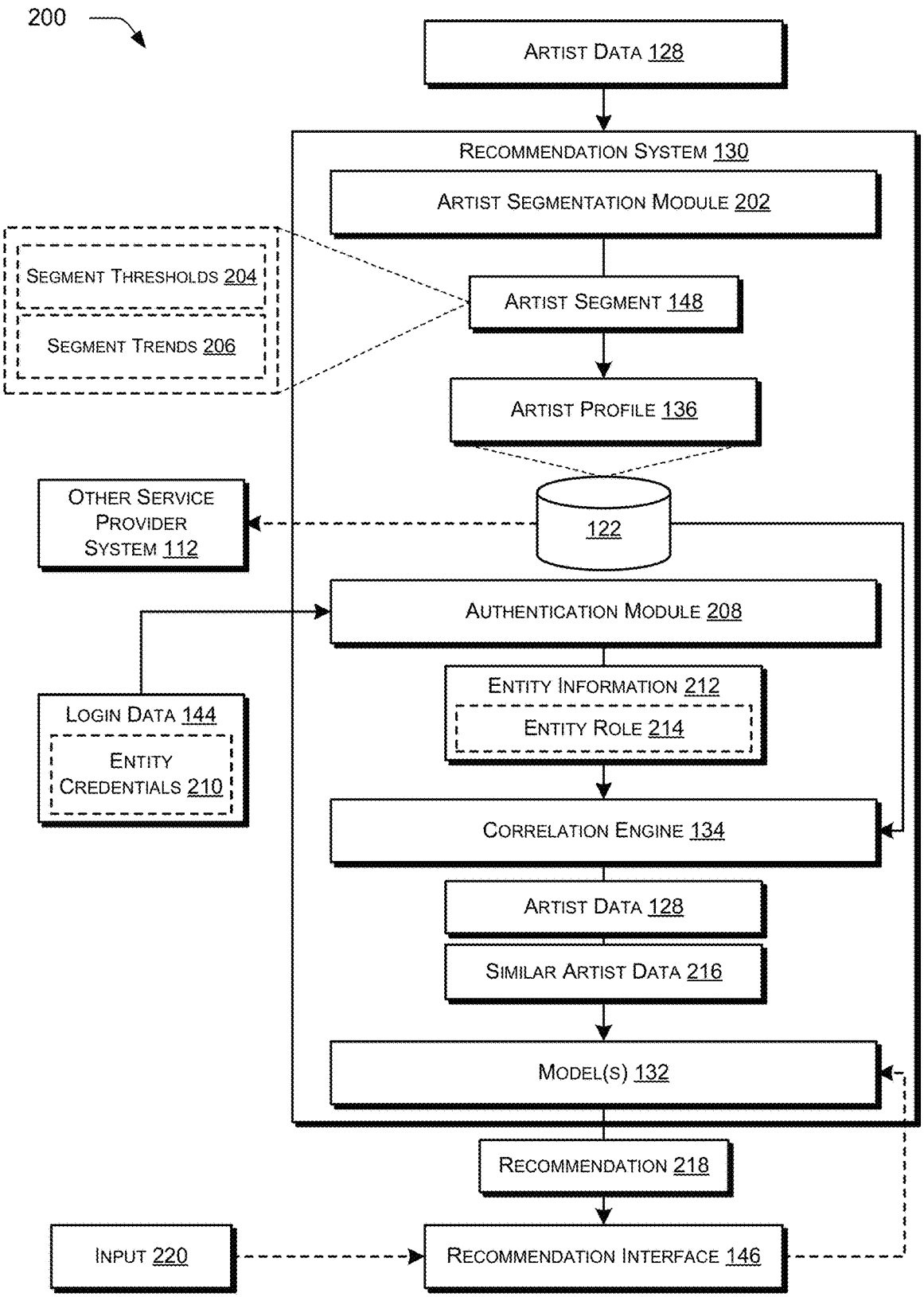
FIG. 2 is a non-limiting example of a recommendation system that outputs a recommendation in a recommendation interface for an artist in accordance with one or more implementations described herein.

FIG. 2 is a non-limiting structural and operational example 200 of a recommendation system that outputs a recommendation in a recommendation interface for an artist.

In the example 200, the recommendation system 130 is depicted as receiving artist data 128 for an artist 116. In implementations, the artist data 128 is received by the recommendation system 130 from various sources, such as from one or more other service provider systems 112, from storage 122, combinations thereof, and so forth. The example 200 represents an instance where the artist data 128 is received for an artist that has yet to be assigned to an artist segment 148 in the artist platform 124.

The recommendation system 130 is depicted as including an artist segmentation module 202. The artist segmentation module 202 represents functionality of the recommendation system 130 to assign an artist associated with the artist data 128 to an artist segment 148. In implementations, each artist segment 148 is associated with one or more segment thresholds 204, one or more segment trends 206, or combinations thereof. The segment thresholds 204 are representative of one or more threshold values against which values represented in the artist data 128 are compared to determine whether an artist 116 should be assigned to an artist segment 148.

For instance, example threshold values included in the one or more segment thresholds 204 for an artist segment 148 include a threshold number of overall streams or listens of media content 126 items associated with an artist, threshold number of audience 106 members having sharing certain demographic characteristics, threshold number of public performances, threshold number of albums released, and so forth. It is to be appreciated that the example one or more segment thresholds 204 described herein are merely representative of example metrics by which artists 116 are categorized by different artist segments 148 and that different one or more segment thresholds 204 are useable in accordance with the described techniques.

The segment trends 206 are representative of one or more trends represented in the artist data 128, such as data describing an increase in an overall number of streams of media content 126 items associated with the artist, a trend describing a number of new listeners consuming items of media content 126 associated with the artist, data describing a rate at which tickets for an artist concert are purchased, data describing merchandise sale trends for an artist, combinations thereof, and so forth. It is to be appreciated that the example one or more segment trends 206 described herein are merely representative of example metrics by which artists 116 are categorized by different artist segments 148 and that different segment trends 206 are useable in accordance with the described techniques.

In response to determining that the artist data 128 satisfies one or more segment thresholds 204, one or more segment trends 206, or combinations thereof for an artist segment 148, the artist segmentation module 202 assigns the artist represented by the artist data 128 to the artist segment 148. In scenarios where the artist data 128 satisfies criteria associated with multiple artist segments 148, the artist segmentation module 202 is configured to assign the artist 116 to an artist segment 148 based on a hierarchical ordering of artist segments 148. For instance, in an example scenario where the artist data 128 satisfies one or more segment thresholds 204 for both a "Rising" and an "Established" artist segment 148, the artist segmentation module 202 identifies that the "Established" artist segment 148 is ranked as a better artist segment and assigns the artist identified by artist data 128 to the "Established" artist segment 148.

Upon assigning an artist to an artist segment 148, or otherwise associating the artist with the artist segment 148, an artist profile 136 for the artist is updated to reflect that the artist is identified as sharing one or more characteristics with other artists included in the artist segment 148. The updated artist profile 136, with information describing the artist segment 148 assigned to the artist profile 136, is stored in the storage 122 for subsequent use by the recommendation system 130. Alternatively or additionally, the artist profile 136 with an assigned artist segment 148 is output to a third-party storage location, such as a computing device associated with the artist 116 identified by the artist data 128, the other service provider system 112, combinations thereof, and so forth.

In some implementations, in addition to assigning an artist to an artist segment 148 using artist data 128 as described above, the recommendation system 130 assigns an artist to an artist segment 148 using artist data 128 describing a financial budget for the artist. For instance, in some implementations the artist data 128 includes information describing an amount of money available for use by an artist (e.g., an advance provided by a music label or financial institution associated with the artist), which is used to estimate a budget for the artist. An estimated budget for an artist, in some implementations, is also determined based on other artist data 128, such as one or more geographical locations associated with the artist, one or more genres associated with the artist, combinations thereof, and so forth. The recommendation system 130 is thus configured to assign an artist to an artist segment 148 such that the artist is grouped with other artists having comparable financial resources available at their disposal (e.g., having similar estimated budgets). By doing so, the recommendation system 130 avoids generating recommendations for an artist based on actions taken by other artists having significantly more available budget.

The recommendation system 130 is further depicted as including an authentication module 208. The authentication module 208 represents functionality of the recommendation system 130 to ensure that an entity requesting access to artist data 128 maintained by the artist platform 124 is authorized to access the artist data 128. In this manner, in some implementations the authentication module 208 restricts access by the service provider system 112 to data maintained in storage 122 unless the service provider system 112 is authenticated via entity credentials 210 (e.g., verifiable credentials included in the login data 144). The entity credentials 210 included in login data 144 are representative of various forms of verifiable information. For instance, in a classic username and password combination scenario, the entity credentials 210 include a username for an authorized entity (e.g., an artist 116 or an authorized agent 142 of the artist) and a password created by the authorized entity.

Alternatively or additionally, the entity credentials 210 are representative of two-factor authentication (2FA) credentials, which adds an additional layer of security to the basic username-password credential example. For instance, in response to receiving login data 144, the authentication module 208 transmits a one-time code to a computing device associated with an entity identified by the login data 144 and prompts the entity to enter the one-time code as part of the entity credentials 210 to access artist data 128 or a recommendation generated by the recommendation system 130. Alternatively or additionally, the entity credentials 210 are representative of biometric information (e.g., fingerprints, face recognition, iris scans, and so forth). Alternatively or additionally, the entity credentials 210 are representative of physical security tokens or key fobs, such as tokens that generate a code, which is required to be submitted to the authentication module 208 as part of the login data 144. Thus, to ensure data security, the authentication module 208 is configured to verify that a requesting entity is authorized to access artist data 128 from the artist platform 124 before granting access.

As part of verifying that a requesting entity (e.g., a user who submitted the login data 144) is authorized to access artist data 128 for an artist, the authentication module 208 identifies entity information 212 for the requesting entity. In some implementations, the entity information 212 identifies a role 214 for the requesting entity. For instance, in a scenario where the entity information 212 specifies that the requesting entity is a manager for multiple artists 116, the entity role 214 is representative of information describing how the manager is authorized to view artist data 128 associated with each of the multiple artists. As another example, in a scenario where the entity information 212 specifies that the requesting entity is a tour booking agent for an artist 116, the entity role 214 is useable to inform the recommendation system 130 that a recommendation should be generated for a goal associated with the tour booking agent (e.g., planning a tour route and booking venues that are likely to sell the most tickets while minimizing a cost to do so). Although described in the context of some example entity roles 214 and associated goals or objectives for each role, the described examples are not limiting, and the techniques described herein extend to any suitable combination of one or more goals being defined for any range of entity roles.

The authentication module 208 provides the entity information 212, and optionally information describing a role 214 associated with an entity requesting access to the artist data 128 via the login data 144, to the correlation engine 134. The correlation engine 134 is configured to identify one or more portions of the artist data 128, or an entirety of the artist data 128 for input to the model(s) 132 based on the entity information 212 of an entity requesting access to the recommendation system 130 via the login data 144. For instance, in response to detecting that a role 214 of a requesting entity indicates that the entity is likely interested in a recommendation for increasing consumption of a media content 126 item associated with an artist, the correlation engine 134 identifies one or more portions of artist data 128 similar to training data that was used to guide the model(s) 132 to predict actions to take for increasing consumption of a media content 126 item. This training data used to guide the model(s) 132 to predict actions that, when taken, are likely to produce a positive result for the artist 116 or their authorized agent 142, is represented in the illustrated example 200 by similar artist data 216.

For instance, in accordance with one or more implementations, the similar artist data 216 represents training data for the model(s) 132, such as one or more positive training examples, one or more negative training examples, or combinations thereof. In implementations, individual ones of the different model(s) 132 are trained for a specific objective (e.g., an objective that corresponds to a defined entity role 214). Example objectives include increased consumption of a media content 126, increased merchandise sales, increased mentions in the news or social media, increased ticket sales, combinations thereof, and so forth. Training data (e.g., as represented by the similar artist data 216) for each objective is thus configured to include artist data 128 and an observable result associated with the objective (e.g., number of media content 126 streams, ticket sales, merchandise sales, social media mentions/shares, combinations thereof, and so forth).

As described herein, a positive training pair for the model(s) 132 includes a vector representation of artist data 128 and an observed result that describes a positive outcome for an objective or goal associated with the model(s) 132. Conversely, a negative training pair for the model(s) 132 includes a vector representation of artist data 128 and an observed result that describes a negative outcome for an objective or goal associated with the model(s) 132.

In implementations, the correlation engine 134 selects similar artist data 216 to use for training one or more of the model(s) 132 such that the models model(s) 132 are trained to generate recommendations for an artist based on observed results for similar artists. For instance, the similar artist data 216 represents data describing artists that are currently, or were previously, associated with a same artist segment 148 as an artist for which a recommendation 218 is being generated. Although examples are described in the context of leveraging similar artist data 216 to generate a recommendation based on observed results of artists having one or more characteristics that are similar to an artist for which the recommendation 218 is being generated, the techniques described herein are not so limited. For instance, in some implementations one or more of the model(s) 132 are trained based on artist data for dissimilar artists, such that a recommendation 218 is generated based on observed results for artists not affiliated with the artist segment 148 as the artist for which the recommendation 218 is being generated.

In implementations, the model(s) 132 are trained to favor data that is specific to an artist for which the recommendation 218 is being generated. For instance, consider an example implementation where the recommendation 218 is being generated for an artist 116 that has insufficient artist data 128 (e.g., that has limited or no artist data 128 describing characteristics of the artist otherwise used to generate the recommendation 218). To account for insufficient artist data scenarios, the model(s) 132 are trained to predict one or more actions that are likely to produce a positive result for the artist 116 based on training data that describes positive results observed for one or more different artists that share similar characteristics with the artist 116 having insufficient artist data 128. The model(s) 132 are trained to favor generating the recommendation 218 based on artist data 128 for the artist 116 (e.g., over artist data 128 for similar artists). In this manner, as artist data 128 is collected for the artist 116 previously having insufficient data, subsequent recommendations 218 are generated by the model(s) 132 with more weight attributed to observed data for the artist 116, such that the recommendations 218 become increasingly tailored to a particular artist. For example, the model(s) 132 are able to identify that a particular artist 116 experiences more engagement after performing live events, despite data for similar artists indicating that digital advertisement campaigns is more likely to increase user engagement, and the model(s) 132 generate a recommendation to perform a live event instead of conducting a digital advertisement campaign. As another example, the model(s) 132 are trained to identify that a particular artist experiences more positive results when consistently releasing single tracks, in contrast to similar artists experiencing positive results when releasing an entire album, and recommend single track releases over an album release.

The recommendation 218 is then output by the recommendation system 130 in a recommendation interface 146. In implementations, the recommendation interface 146 is further generated to include one or more controls that are selectable to initiate performance of an action recommended by the recommendation 218. Examples of recommendations 218 provided by a recommendation interface 146, and controls that are selectable to initiate performance of actions recommended by the recommendation 218, are described in further detail below with respect to FIGS. 3-9. In implementations, input 220 to one or more controls presented in the recommendation interface 146 causes the recommendation system 130 to update the recommendation interface 146 (e.g., to provide a recommendation for an objective specified via input 220). Alternatively or additionally, input 220 causes the recommendation system 130 to provide feedback to the model(s) 132 indicating whether recommended actions were performed, as indicated by the dashed arrow returning to the model(s) 132 from the recommendation interface 146.

For instance, in response to input 220 at a selectable control included in the recommendation interface 146, feedback is provided to the recommendation system 130 indicating that an action recommended by the recommendation 218 was undertaken. This feedback further enables the model(s) 132 to learn trends regarding responses (e.g., in audience data 140) that can be associated as occurring as a result of carrying out a recommended action. As a specific example, the information describing performance of an action recommended by the recommendation 218, coupled with audience data audience data 140 observed within a timeframe following occurrence of the action (e.g., audience data 140 observed within one week following performance of a recommended action) can be provided as an additional training example to the model(s) 132. This additional training example enables the model(s) 132 to learn patterns that can be predicted in response to occurrence of a certain event.

Parameters described in each training example provided to the model(s) 132 (e.g., parameters describing the similar artist data 216 or feedback regarding an action initiated via the recommendation interface 146) are useable to define the action and/or observed result with varying levels of granularity.

For instance, consider an example scenario where the recommendation 218 suggests for an artist to schedule a concert performance and the input 220 indicates that the artist booked a venue for a concert. In this example scenario, feedback provided to the model(s) 132 is useable to describe parameters of the concert, such as venue size, sales info (e.g., a number of tickets sold, a rate of ticket sales, etc.), weather during the concert, a time and date of the concert, a location of the concert, and so forth. In this manner, data used to train the model(s) 132 in generating a recommendation 218 defines with specificity various parameters or characteristics of an action, rather than simply providing an indication of action occurrence (e.g., that a concert took place).

Based on the training data (e.g., as represented by the artist data 128 for an artist, by similar artist data 216 for one or more different artists, feedback based on input 220 to a recommendation interface 146, or combinations thereof), each of the model(s) 132 is trained to predict an action that, when performed, is likely to achieve a positive outcome for an artist (e.g., an increase in consumption of media content 126 items associated with the artist). By consistently providing feedback describing whether an action suggested by the recommendation 218 was performed, and observed artist data 128 occurring in response to performance of the suggested action, the recommendation system 130 guides the model(s) 132 via ongoing training, thus avoiding overfitting the model(s) 132 to original training data.

For a further visualization of the recommendation system 130 outputting a recommendation 218 in a recommendation interface 146 for an artist 116 or an authorized agent 142 of an artist, consider FIGS. 3-9 in the context of the following description.

Figure 3:
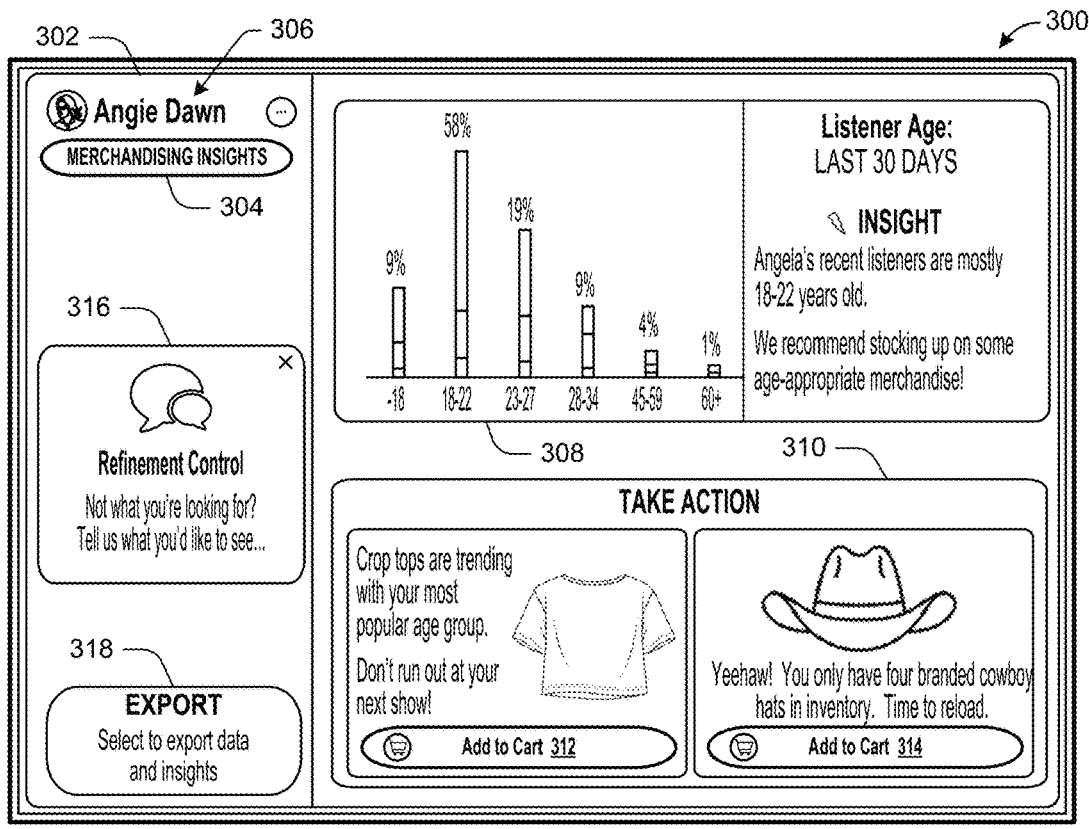
FIG. 3 is a non-limiting example of a user interface that includes a recommendation generated by the recommendation system in accordance with one or more implementations described herein.

FIG. 3 is a non-limiting example 300 of a user interface 302 that includes a recommendation 218 generated by the recommendation system 130.

In the illustrated example 300, the user interface 302 represents an example instance of the recommendation interface 146 output by the recommendation system 130. Specifically, the user interface 302 depicts a scenario where the recommendation interface 146 is configured to provide merchandising insights, as represented by caption 304, for an artist "Angie Dawn," as identified by artist identifier 306. In implementations, the user interface 302 represents an instance where an entity role 214 identified from entity credentials 210 included in login data 144 indicate that the entity for which the user interface 302 is generated corresponds to an authorized agent 142 tasked with handling merchandise orders and sales for an artist 116. The user interface 302 is generated to include a portion 308 that describes observed artist data 128 for the artist identified by artist identifier 306. For instance, in the illustrated example 300, portion 308 presents a graph describing an age of listeners (e.g., as represented in audience data 140) of media content 126 items associated with the artist identifier 306 during the past 30 days. The portion 308 further summarizes one or more insights identified by the recommendation system 130 (e.g., that the artist's recent listeners are predominantly in the age range of 18-22 years old and that based on this insight the artist is recommended to stock up on age-appropriate merchandise).

The user interface 302 further includes a portion 310 that describes one or more recommended actions, which are predicted by the model(s) 132 to result in a positive outcome for the artist. Specifically, recommended actions included in the portion 310 correspond to recommendation 218 for generating a positive outcome according to one or more merchandising objectives, as tailored for the entity role or objective identified by caption 304. In the illustrated example of FIG. 3, portion 310 includes a first recommendation to purchase crop tops, with an explanation that crop tops have been identified as trending merchandise items among the age group with which the artist is most popular, as identified in portion 308. The recommendation to purchase more crop tops is also presented in the user interface 302 with a selectable control 312 to purchase a recommended quantity of crop tops.

For instance, in response to detecting input selecting the control 312, the recommendation system 130 initiates a transaction for purchasing the recommended crop tops from one or more merchants communicatively coupled to the media content service provider system 102 (e.g., as described in further detail below with respect to FIGS. 13-15). In the illustrated example of FIG. 3, portion 310 additionally includes a recommendation to purchase branded cowboy hats, based on an indication in artist data 128 that the artist has a limited quantity of branded cowboy hats remaining in inventory. The recommendation to purchase more cowboy hats is presented in the user interface 302 with a control 314 that is selectable to initiate a transaction for purchasing the cowboy hats from one or more merchants communicatively coupled to the media content service provider system 102.

In addition to presenting portion 308 with information describing artist data 128 used as a basis for generating one or more recommendations 218 and presenting portion 310 with the one or more recommendations 218 and selectable controls to initiate performance of actions recommended by the one or more recommendations 218, the user interface 302 includes control 316 and control 318. Control 318 is representative of functionality to export data (e.g., artist data 128), insights identified from the artist data 128, recommendations derived from artist data 128, or combinations thereof, to one or more third-party platforms (e.g., service provider system 112). In response to detecting input at control 318, the media content service provider system 102 is configured to present a list of available destinations for exporting data (e.g., local storage of the computing device 110 at which the recommendation interface 146 is displayed, the service provider system 112, and so forth) and export data to the selected destination(s).

Control 316 is representative of one or more controls for refining data displayed as part of the user interface 302. For instance, the control 316 represents functionality to refine a manner in which a recommendation 218 is generated for an artist 116 (e.g., to change a time frame over which artist data 128 should be evaluated to generate a recommendation 218, to change a demographic group of listeners for which a recommendation 218 should be generated, to generate a recommendation 218 for a specific objective, combinations thereof, and so forth. In implementations, control 316 is configurable as any suitable number and/or type of controls (e.g., selectable icons, buttons, slider controls, checkboxes, dropdown menus, text input fields, toggle switches, date pickers, time pickers, chat windows, combinations thereof, and so forth). In the illustrated examples of a recommendation interface 146 (e.g., as represented in FIGS. 3-9), the control 316 is depicted as a chat window configured to provide a conversational interface for users to describe how the recommendation interface 146 should be updated for a desired result.

Figure 4:
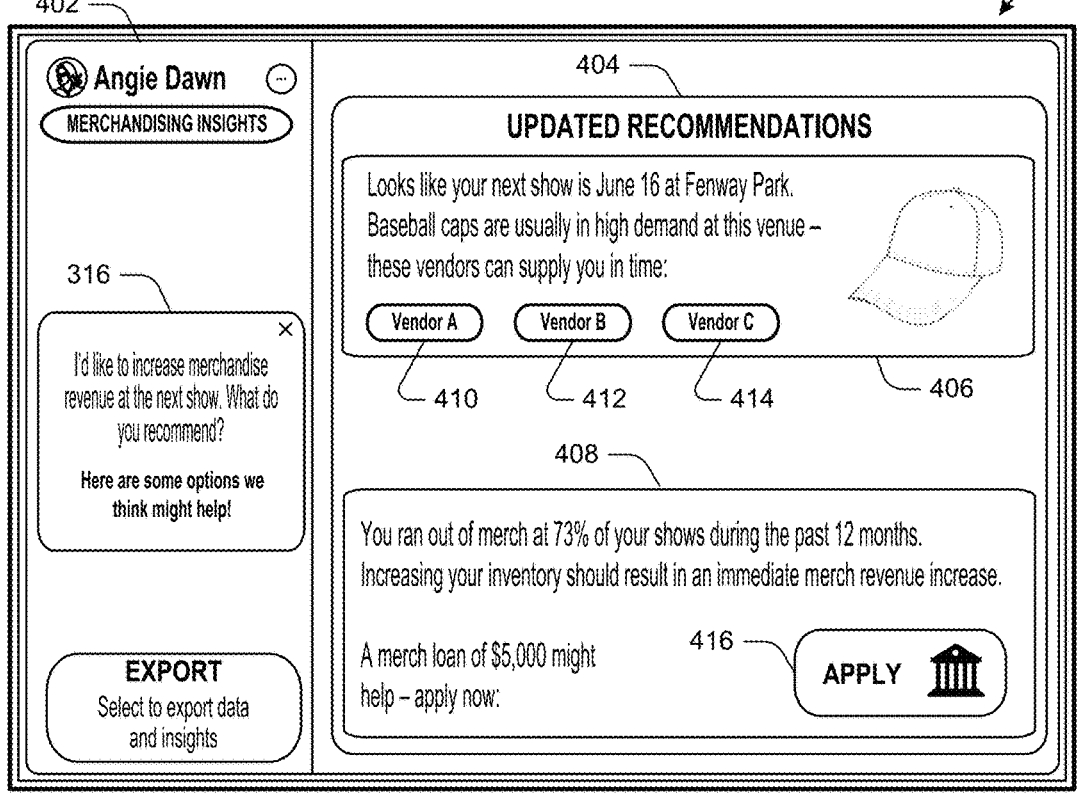
FIG. 4 is a non-limiting example of a user interface that includes a recommendation generated by the recommendation system in accordance with one or more implementations described herein.

For instance, FIG. 4 depicts an updated instance of user interface 302 generated in response to receiving input to the control 316.

In the illustrated example 400 of FIG. 4, the user interface 402 represents an updated instance of user interface 302, based on input provided to the control 316. Specifically, FIG. 4 illustrates a scenario where input to the control 316 indicates that the entity accessing the recommendation interface 146 (e.g., the artist identified by artist identifier 306 or an authorized agent 142 thereof) is interested in a recommendation for increasing merchandise revenue at the artist's next show.

Based on the input to the control 316, feedback is provided by the recommendation system 130 to the model(s) 132, which causes the model(s) 132 to generate a recommendation 218 to achieve an objective for increasing merchandise sales at a next scheduled show (e.g., as represented in artist data 128 for the artist). The updated recommendations are displayed in portion 404 of the user interface 402, which includes a first recommendation 406 and a second recommendation 408 as a specific example. The first recommendation 406 indicates that the recommendation system 130 is generating the updated recommendation presuming that the artist's next show will be on June 16 at Fenway Park.

The first recommendation 406 further identifies that, based on observed training data (e.g., similar artist data 216), baseball caps are usually in high demand for concerts at the venue, and that increasing merchandise sales during the Fenway Park show will benefit from ordering baseball caps. The first recommendation 406 additionally includes multiple selectable options to initiate performance of the recommended action (e.g., ordering baseball caps). Specifically, control 410, control 412, and control 414 are each selectable to order baseball caps from different vendors (e.g., Vendor A, Vendor B, and Vendor C, respective). The first recommendation 406 further provides insight regarding why the different vendors were identified by the model(s) 132 as suggested providers for the recommended merchandise order, indicating that historical data suggests Vendor A, Vendor B, and Vendor C can fulfill baseball cap orders in time for the June 16 show at the Fenway Park location.

The second recommendation 408 further indicates that, based on past artist data 128 for the artist, the recommendation system 130 has identified that merchandise for the artist sold out at 73% of the artist's shows during the past 12 months. Based on this insight, the second recommendation 408 suggests that taking out a $5,000 merchandise loan to stock up on additional merchandise for the June 16 show will result in a merchandise revenue increase (e.g., a positive outcome for the desired objective specified via control 316). The second recommendation 408 thus represents an instance of generating a recommendation 218 based on an estimated budget available to an artist 116 (e.g., based on artist data 128). The second recommendation 408 is presented with a control 416 that is selectable to initiate an application for a $5,000 merchandise loan via one or more financial institutions or lending entities connected to the media content service provider system 102.

In some implementations, the control 416 that is selectable to initiate an application for a $5,000 merchandise loan is selectable to initiate a financing application through the media content service provider system 102. In such an implementation, the artist or authorized agent selecting control 416 is provided with financing via the media content service provider system 102, and not forced to request financing from a financial institution outside the media content service provider system, as described in further detail below with respect to FIGS. 13-15. In such implementations, an artist or authorized agent is able to finance and repay a loan entirely within the media content service provider system 102 (e.g., using revenue generated by streaming media content 126 via the service provider system 102), which is not possible using conventional systems. In a similar manner, in implementations where the control 416 is selected to initiate an application for a merchandise loan, the media content service provider system 102 is configured to identify one or more recommended merchants based on historical transactions between the merchant and the media content service provider system 102 (e.g., to recommend a reliable merchant), and the media content service provider system 102 is configured to facilitate transfer of funds from the artist to the recommended merchant.

Figure 5:
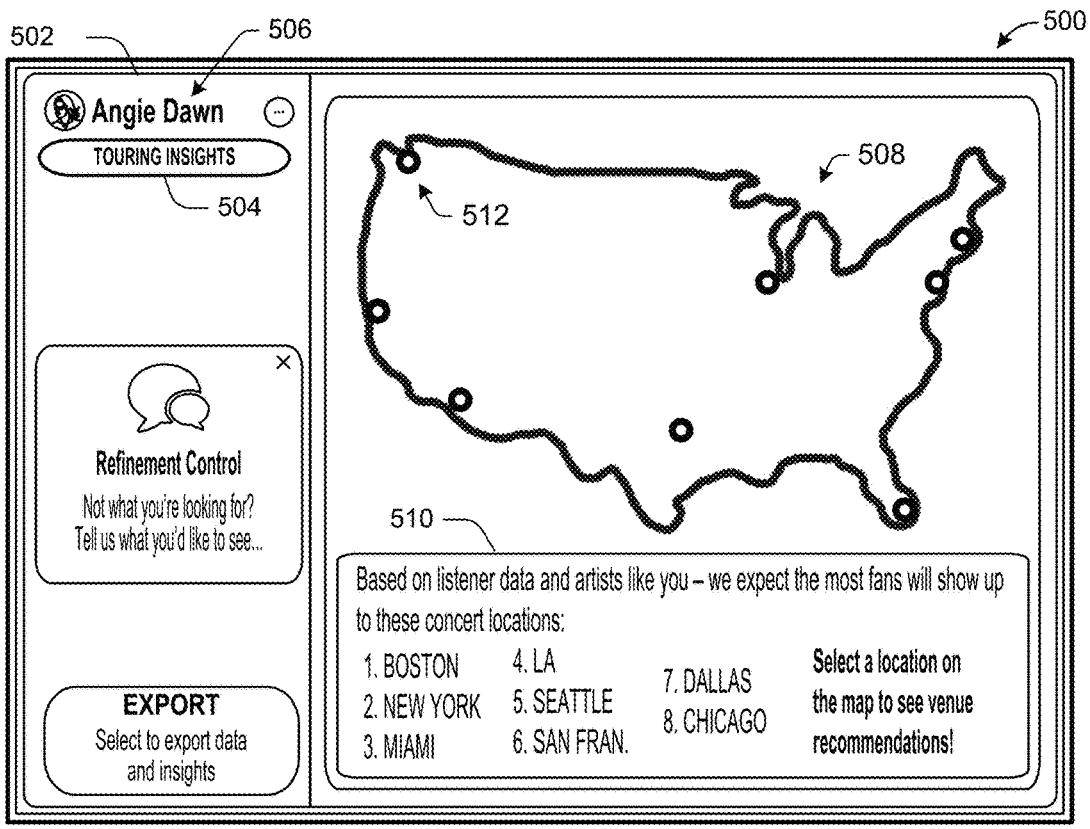
FIG. 5 is a non-limiting example of a user interface that includes a recommendation generated by the recommendation system in accordance with one or more implementations described herein.

FIG. 5 is a non-limiting example 500 of a user interface 502 that includes a recommendation 218 generated by the recommendation system 130.

The user interface 502 represents an example instance of the recommendation interface 146 output by the recommendation system 130. Specifically, the user interface 502 depicts a scenario where the recommendation interface 146 is configured to provide touring insights, as represented by caption 504, for an artist identified by artist identifier 506. In implementations, the user interface 502 represents an instance where a role 214 identified from entity credentials included in login data 144 indicate that the entity for which the user interface 502 is generated corresponds to an authorized agent 142 tasked with handling tour planning for an artist 116.

The user interface 502 is generated to include a map 508 that depicts recommended tour stops (e.g., based on artist data 128 for the artist 116, artist data artist data 128 for other artists assigned to a same artist segment 148 as the artist 116, artist data 128 for other artists that are assigned to a different artist segment 148 as the artist 116 but share one or more common characteristics with the artist 116, and combinations thereof). The user interface 502 further includes a portion 510 that summarizes one or more insights identified by the recommendation system 130 as part of generating the recommended tour stops.

Specifically, portion 510 describes how the recommendation 218 is generated based on the artists' data and data for similar artists (e.g., different artists in the artist segment 148 associated with the artist) and that the recommendation includes a ranked list of eight concert locations where fans are most likely to attend. The portion 510 further indicates that the map 508 is interactive, such that selecting a location will populate venue recommendations for the selected location in the recommendation interface 146. For instance, in response to detecting input (e.g., input 220) at location 512 on the map 508, the recommendation system 130 will update the recommendation interface 146 to provide recommended venues associated with location 512.

Figure 6:
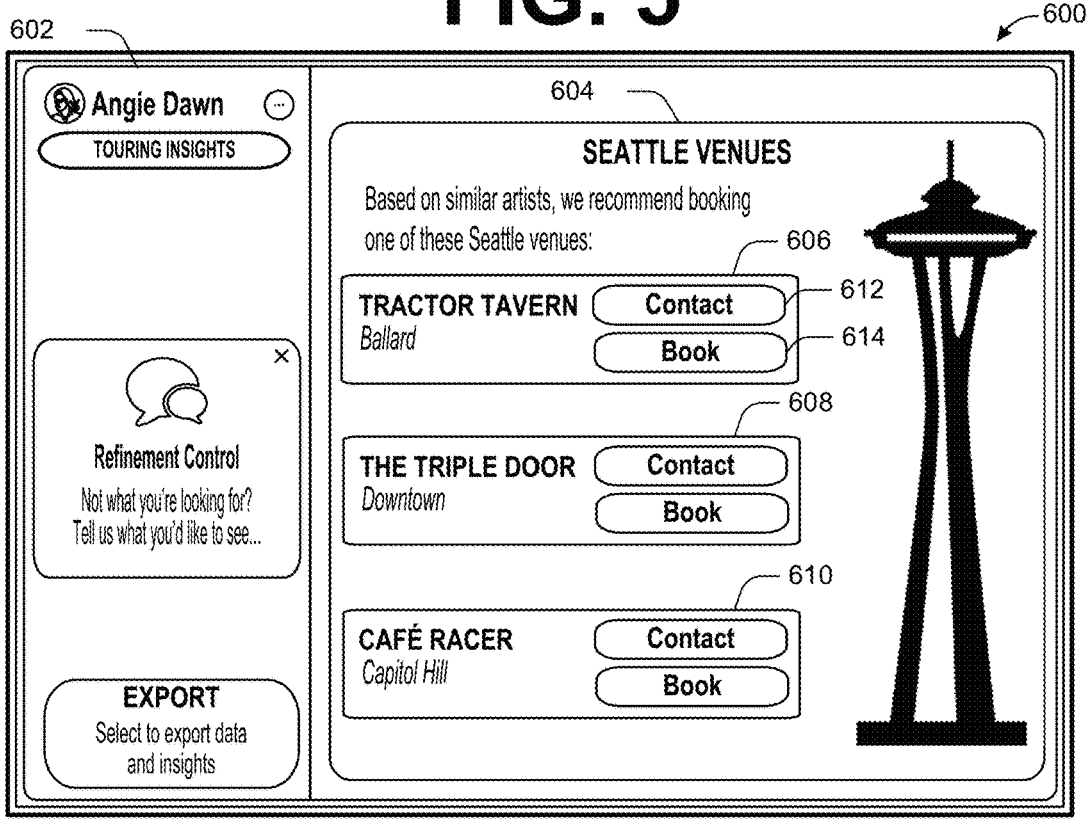
FIG. 6 is a non-limiting example of a user interface that includes a recommendation generated by the recommendation system in accordance with one or more implementations described herein.

FIG. 6 depicts an updated instance of the user interface 502, which is output in response to receiving input 220 selecting the location 512 on the map 508.

In the illustrated example 600 of FIG. 6, the user interface 602 represents an updated instance of the user interface 502, generated by the recommendation system 130 in response to receiving input 220 selecting the location 512 on the map 508. Specifically, FIG. 6 illustrates a scenario where the location 512 corresponds to Seattle and the user interface 602 presents recommended venues for the artist 116 to schedule a concert. In the illustrated example, user interface 602 includes a portion 604 that lists different Seattle venues identified by the model(s) 132 as being recommended candidates (e.g., based on artist data 128 for the artist and different artists assigned to a same or similar artist segment 148).

Specifically, portion 604 includes three recommended venues for the artist in Seattle, represented as the first venue 606, the second venue 608, and the third venue 610 in the user interface 602. Each venue listed in portion 604 includes information describing the venue (e.g., a name, a location, capacity, a venue type, etc.) and is associated with one or more selectable controls for initiating performance of an action associated with the venue. For instance, the first venue 606 listed in portion 604 indicates that the Tractor Tavern in Ballard is identified as a recommended Seattle venue for the artist "Angie Dawn" to schedule a performance. The portion 604 further includes control 612 and control 614 for initiating performance of a recommended action, where control 612 is selectable to initiate a communication channel between the artist and the Tractor Tavern and control 614 is selectable to book (e.g., reserve) the Tractor Tavern for a performance.

Input at one or more of the controls is monitored by the recommendation system 130 and used to update artist data 128 for the artist, provide feedback in the form of additional training examples to the model(s) 132, or a combination thereof. For instance, in response to detecting input at control 614, signifying that the artist has scheduled a concert at the first venue 606, artist data 128 for the artist is updated to reflect the scheduled concert. Alternatively or additionally, a training example is generated for the model(s) 132 based on observed results in the artist data 128 that occur in response to the scheduled concert (e.g., streams of media content 126 associated with the artist 116 in advance of and/or following the concert, merchandise sales, social media mentions, combinations thereof, and so forth).

In this manner, the training example is useable to provide feedback to the model(s) 132 regarding whether the predicted outcome of booking a concert at the first venue 606 actually occurred. For instance, consider an example implementation where the model(s) 132 predicted that the concert at the first venue 606 would increase consumption of media content 126 associated with the artist by 10%, and output the recommendation to book a concert at the first venue 606 based on this 10% increase. The recommendation system 130 is configured to monitor artist data 128 for the artist following occurrence of the concert at the first venue 606 to determine whether the 10% increase in media content 126 consumption occurred and further refine parameters (e.g., internal weights) of the model(s) 132 to bias the model(s) 132 towards making more accurate recommendations 218 in the future, based on observed data.

Figure 7:
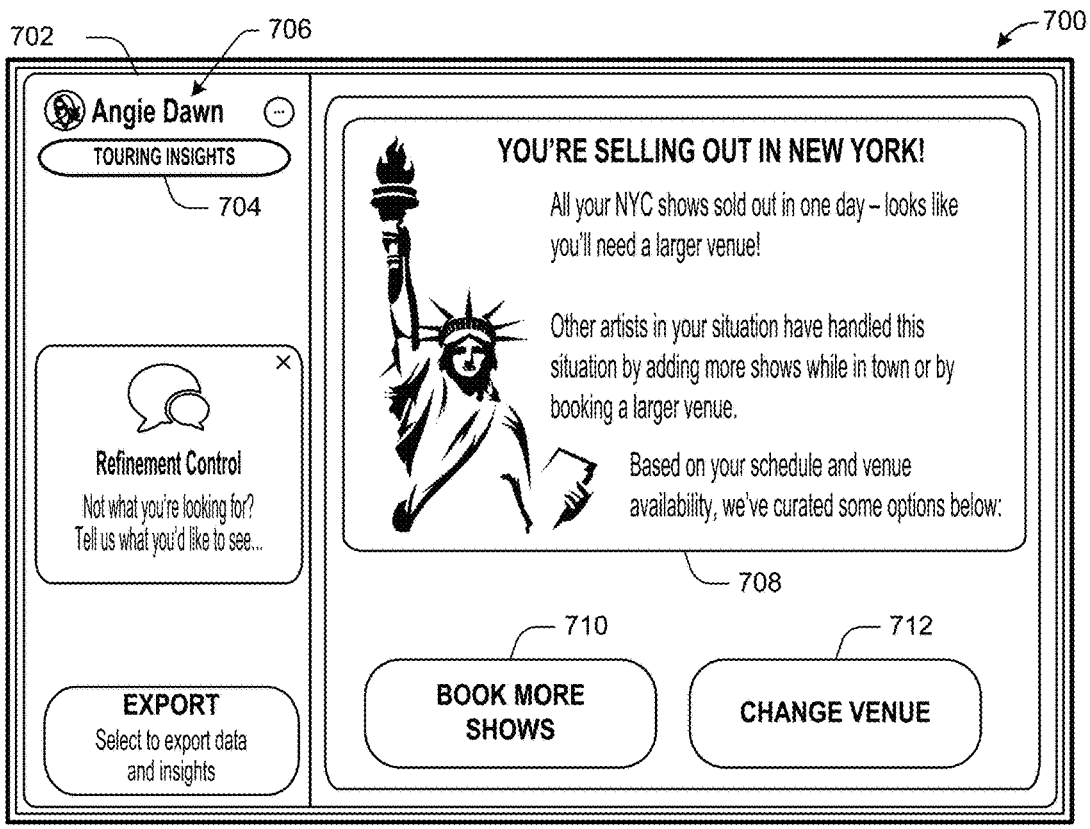
FIG. 7 is a non-limiting example of a user interface that includes a recommendation generated by the recommendation system in accordance with one or more implementations described herein.

FIG. 7 is a non-limiting example 700 of another user interface 702 that includes a recommendation 218 generated by the recommendation system 130.

In the illustrated example 700, the use interface 702 represents an example instance of the recommendation interface 146 output by the recommendation system 130. Specifically, the user interface 702 depicts a scenario where the recommendation interface 146 is configured to provide touring insights, as represented by caption 704, for an artist "Angie Dawn," as identified by artist identifier 706. Similar to FIGS. 5 and 6, the user interface 702 represents an instance where a role 214 identified from entity credentials included in login data 144 indicate that the entity for which the user interface 702 is generated corresponds to an authorized agent 142 tasked with handling tour planning for an artist 116.

The user interface 702 is generated to include a portion 708 that describes one or more insights derived from artist data 128 that are pertinent to the role 214 for which the recommendation 218 is generated (e.g., pertinent to planning a tour for the artist). Specifically, portion 708 includes information describing how artist data 128 for the artist associated with artist identifier 706 indicates that all scheduled New York City shows were sold out in one day. Portion 708 further includes information describing how the recommendation system 130 identified that artists (e.g., other artists associated with the artist segment 148 to which the artist 116 is assigned) with artist data 128 describing occurrence of similar sellout situations have experienced positive results by booking more shows in New York City and/or by booking a larger venue.

The portion 708 further includes information explaining that the recommendation system 130 has curated options for booking more shows or changing venues based on data describing the artist's schedule (e.g., as represented in artist data 128) and availability of one or more venues in the area. The user interface 702 includes option 710, which is selectable to initiate perform one or more actions associated with booking more shows in New York City, as well as option 712, which is selectable to initiate performance of one or more actions associated with changing venues.

Figure 8:
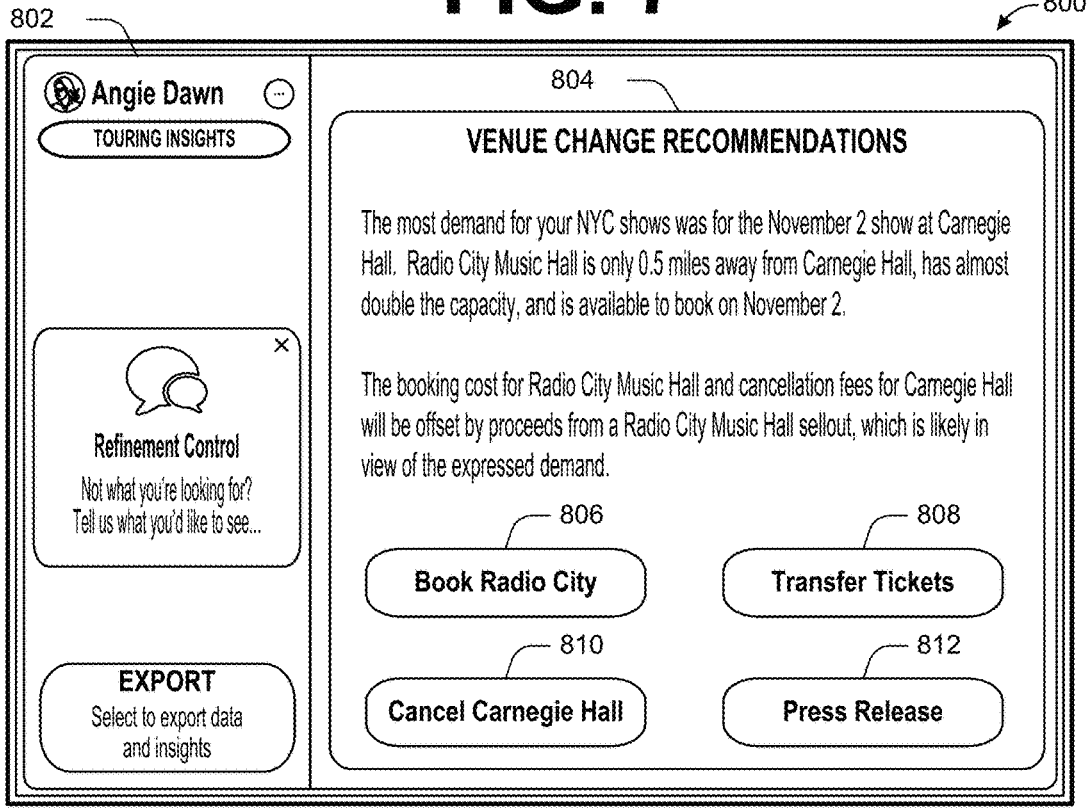
FIG. 8 is a non-limiting example of a user interface that includes a recommendation generated by the recommendation system in accordance with one or more implementations described herein.

FIG. 8 depicts an updated instance of the user interface 702, which is output in response to receiving input 220 selecting the option 712.

In the illustrated example 800 of FIG. 8, the user interface 802 represents the updated instance of user interface 702, generated by the recommendation system 130 in response to detecting input 220 selecting the option 712. Specifically, the user interface 802 includes a portion 804 that includes information describing a basis for a recommended venue change (e.g., based on artist data 128 for the artist and other artists associated with the same or similar artist segment 148 to which the artist 116 is assigned). The portion 804 further includes multiple controls that are individually selectable to perform an action involved in effecting the recommended venue change.

Specifically, portion 804 describes how artist data 128 for the artist indicates that the most demand for the artist's shows in NYC was for a November 2 performance at Carnegie Hall. Based on the sellout information summarized in the user interface 702, the recommended venue change in portion 804 notes how the recommendation system 130 identified Radio City Music Hall as a larger venue in close proximity to Carnegie Hall that has availability for rescheduling the November 2 show to a different venue. The portion 804 further describes information considered by the recommendation system 130 in recommending a venue change (e.g., that booking and cancellation costs are predicted to be offset by proceeds resulting from rescheduling the show to the larger capacity venue provided by Radio City Music Hall).

The controls that are individually selectable to perform an action involved in effecting the recommended venue change included in portion 804 are represented by control 806, control 808, control 810, and control 812. For instance, control 806 is selectable to cause the media content service provider system 102 to automatically book the different venue (e.g., book Radio City Music Hall), such as by communicating a booking request and the requisite funds to reserve a November 2 performance date (e.g., via the communication channels and techniques described below with respect to FIGS. 13-15). In a similar manner, control 808 is selectable to cause the media content service provider system 102 to transfer tickets booked for Carnegie Hall (e.g., by members of the audience 106) to automatically qualify as tickets for the November 2 performance at Radio City Music Hall.

Control 810 is selectable to cause the media content service provider system 102 to cancel the November 2 Carnegie Hall performance (e.g., by transmitting a message indicating an intent to cancel and/or funds for a cancellation fee to one or more appropriate communication channels or financial institutions associated with Carnegie Hall). Finally, control 812 is selectable to cause the media content service provider system 102 to automatically draft and/or publish a press release that includes information informing the audience 106 and general public as to the venue change, availability of additional tickets for the November 2 performance, automatic transfer of tickets from Carnegie Hall to Radio City Music Hall, and so forth.

Input at one or more of the controls is monitored by the recommendation system 130 and used to update artist data 128 for the artist, provide feedback in the form of additional training examples to the model(s) 132, or a combination thereof. For instance, in response to detecting input at control 806 and control 810, artist data 128 for the artist is updated to reflect the changed venue for the November 2 concert. Alternatively or additionally, a training example is generated for the model(s) 132 based on observed results in the artist data 128 that occur in response to the concert venue change (e.g., resulting ticket sales for Radio City, resulting profits or losses associated with the venue change, audience sentiments reflected in social media posts, combinations thereof, and so forth).

In this manner, the training example is useable to provide feedback to the model(s) 132 regarding whether the predicted outcome of booking a concert at the first venue 606 actually occurred. For instance, consider an example implementation where the model(s) 132 predicted that changing the venue to Radio City would result in a profit that offsets the costs associated with canceling Carnegie Hall, and output the recommendation to change the venue based on this prediction. The recommendation system 130 is configured to monitor artist data 128 for the artist following the venue change to determine whether the profit occurred and further refine parameters (e.g., internal weights) of the model(s) 132 to bias the model(s) 132 towards making more accurate recommendations 218 in the future, based on observed data.

Although described above in the context of outputting a recommendation 218 for a single artist 116 in a recommendation interface 146, in some implementations the recommendation system 130 is configured to generate a recommendation interface 146 that includes recommendations for multiple artists 116. For an example of a recommendation interface 146 that includes recommendations for multiple artists 116, consider FIG. 9.

Figure 9:
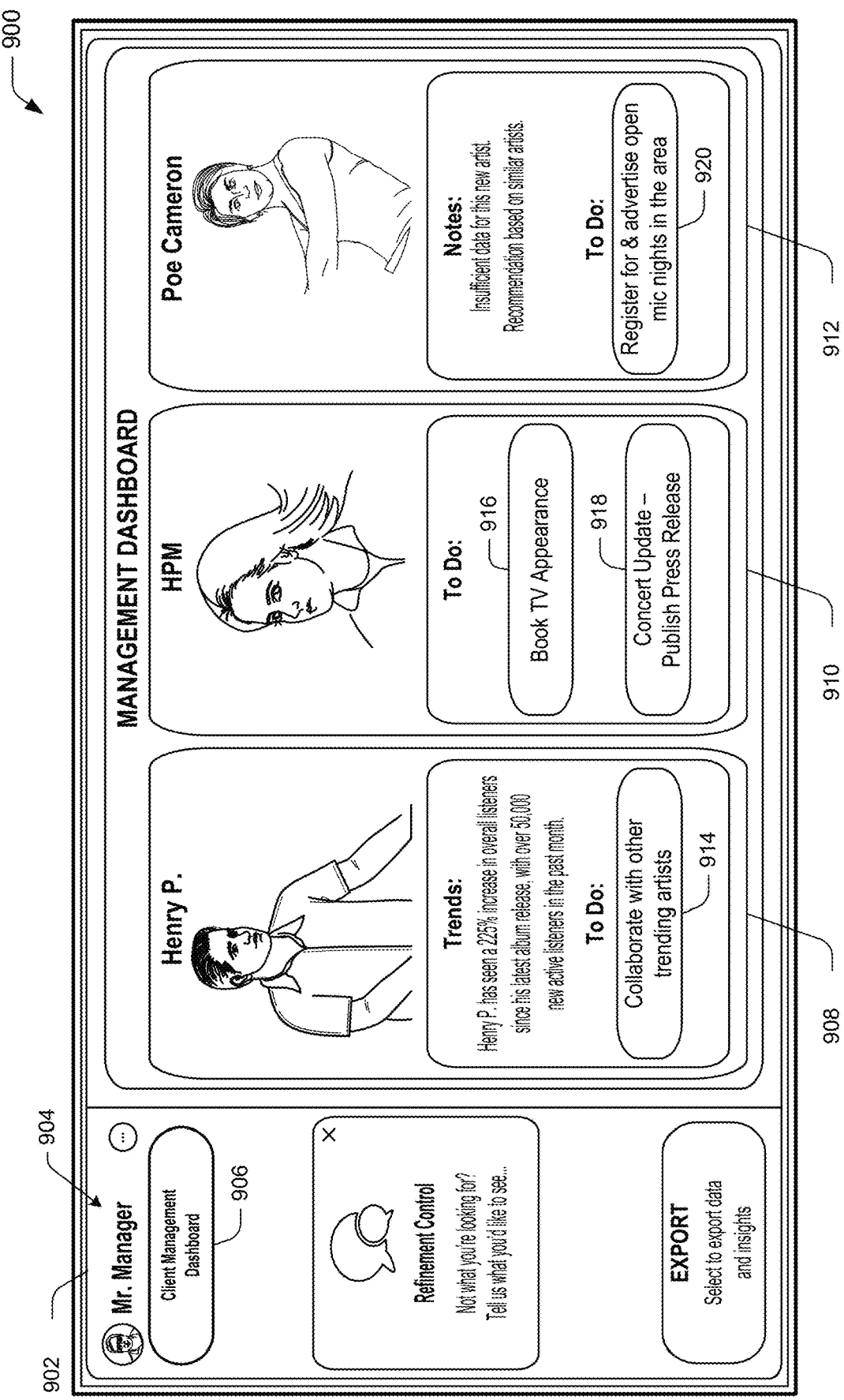
FIG. 9 is a non-limiting example of a user interface that includes a recommendation generated by the recommendation system in accordance with one or more implementations described herein.

FIG. 9 is a non-limiting example 900 of a user interface 902 that includes recommendations 218 generated for multiple, different artists 116.

The user interface 902 represents an example instance of the recommendation interface 146 output by the audience data 140, where recommendations 218 included in the recommendation interface 146 are generated for different artists. Specifically, the user interface 902 depicts a scenario where the recommendation interface 146 presents a client management dashboard, as represented by caption 906, for an entity 904 listed as an authorized agent 142 for multiple artists 116. In implementations, the user interface 902 represents an instance where a role 214 identified from entity credentials included in login data 144 indicate that the entity for which the user interface 902 is generated corresponds to a manager tasked with the overall goal of increasing media content 126 consumption for each artist represented by the manager.

Specifically, the user interface 902 includes multiple portions, such as portion 908, portion 910, and portion 912, where each portion corresponds to a different artist 116 that lists the manager identified as an authorized agent 142 in respective artist data 128 for each of the different artists. In the illustrated example 900, portion 908 corresponds to an artist "Henry P." and includes information describing that the recommendation system 130 has identified a trend representing a 225% increase in overall streams since a recent album release, with over 50,000 new active listeners in the past month. The portion 908 further includes a recommendation for Henry P. to collaborate with other artists in furtherance of the objective to increase consumption of media content 126 items associated with Henry P., where the recommendation is gleaned based on training examples that indicate similar artists experienced the desired objective via collaborations. The portion 908 includes a control 914 that is selectable to initiate performance of a collaboration action, such as establishing a communication channel with a different artist 116 identified by the media content service provider system 102 as being a suitable candidate for collaborating with Henry P Portion 910 corresponds to an artist "HPM," and specifies that it is recommend for HPM to book a television appearance and publish a press release regarding a recent concert update, in furtherance of the objective to increase consumption of media content 126 items associated with HPM. The portion 910 includes a control 916 that is selectable to book a television appearance for HPM and a control 918 that is selectable to publish a press release describing a concert update via one or more communication channels. In implementations, HPM is associated with an artist segment 148 that is different from an artist segment 148 to which Henry P. is assigned. As such, the respective recommendations provided in portion 908 and portion 910 are generated based on different heuristics and/or different model(s) 132— trained based on examples describing observed results occurring when the subject artist (e.g., Henry P. or HPM) and similar artists performed recommended actions.

Finally, portion 912 corresponds to an artist "Poe Cameron," and specifies that Poe Cameron is a relatively unknown artist to the media content service provider system 102 with insufficient artist data 128 to generate a recommendation 218 based on past data pertaining specifically to Poe Cameron. In view of this insufficient data, portion 912 describes that the recommendation 218 is generated based on data for similar artists (e.g., based on past observed results describing audience 106 responses to actions performances by artists when assigned to an "Unknown" artist segment 148. Portion 912 further describes that the recommended action for Poe Cameron is to register for and advertise performance(s) at open microphone nights in Poe Cameron's area. To facilitate performing the recommended activity, portion 912 includes control 920, which is selectable to book open mic performances, advertise an intent to do so, and so forth.

The following discussion describes examples of procedures for generating action item recommendations based on artist data. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, the following procedures include discussion of examples from the figures above but are not necessarily limited to the examples from those figures. In one or more implementations, for example, the procedures may be implemented using different systems (which can optionally include one or more components from the example systems described herein).

Figure 10:
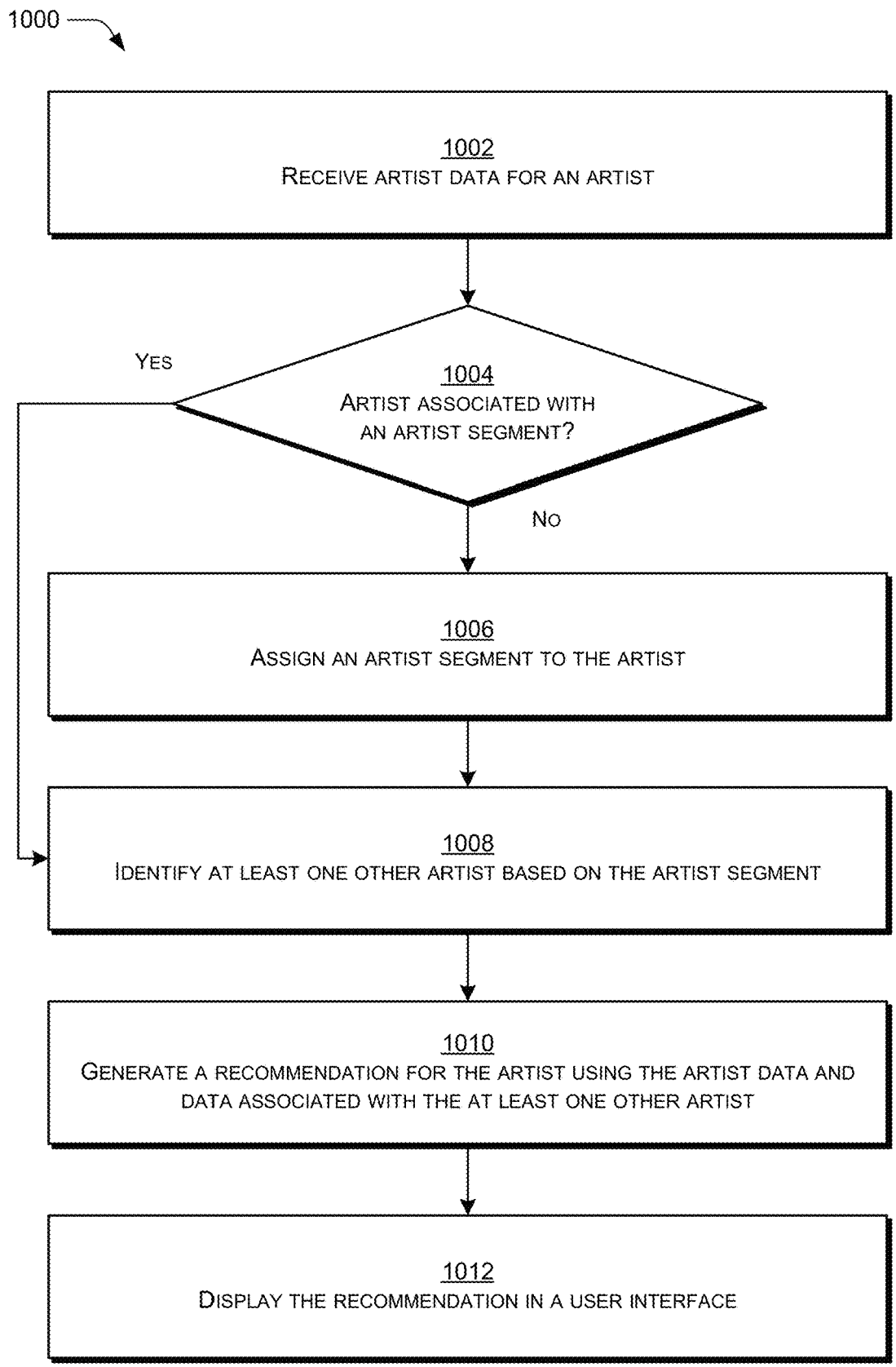
FIG. 10 is a procedure in an example implementation of a recommendation system generating a recommendation for an artist in accordance with one or more implementations described herein.

FIG. 10 is a flow diagram depicting an algorithm as a step-by-step procedure 1000 in an example implementation that is performable by a processing device to generate a recommendation for performing an action based on artist data.

To begin, artist data for an artist is received (block 1002). The recommendation system 130, for instance, obtains recommendation system 130 from storage 122 of the media content service provider system 102. A determination is made as to whether the artist described by the received artist data is associated with an artist segment (block 1004). The recommendation system 130 for instance, determines whether the received artist data 128 or stored data for an artist identified by the received artist data 128, is associated with a artist segment 148.

In response to determining that the artist associated with the artist data has not previously been assigned to or associated with an artist segment (e.g., a "No" determination at block 1004), an artist segment is assigned to the artist (block 1006). The recommendation system 130, for instance, causes the artist segmentation module 202 to process the artist data 128 and assign an artist segment 148 to an artist profile 136 associated with the artist (e.g., based on identifying that the artist data 128 satisfies one or more segment thresholds 204, one or more segment trends 206, or combinations thereof, associated with the artist segment 148).

Alternatively, in response to determining that the artist associated with the artist data is associated with an artist segment (e.g., a "Yes" determination at block 1004 or after performing operations represented by block 1006), at least one other artist is identified based on the artist segment (block 1008). The correlation engine 134, for instance, retrieves similar artist data 216 from the storage 122, which represents one or more instances of artist data 128 that are associated with one or more different artists assigned to a same artist segment 148 as the artist associated with the artist data received in block 1002.

A recommendation is then generated for the artist using the artist data and the data associated with the at least one other artist (block 1010). The recommendation system 130, for instance, generates training data from the similar artist data 216 for training the model(s) 132 to output a recommendation 218 for a defined objective (e.g., increasing consumption of media content 126) based on information described in the artist data received in block 1002. After training one or more model(s) 132 to do so, the artist data received in block 1002 is provided as input to the one or more model(s) 132, which causes the model(s) 132 to output a recommendation 218.

The recommendation is then displayed in a user interface (block 1012). The recommendation system 130, for instance, outputs the recommendation 218 in a recommendation interface 146, such as in one or more of the example recommendation interfaces 146 depicted in the illustrated examples of FIGS. 3-9.

Figure 11:
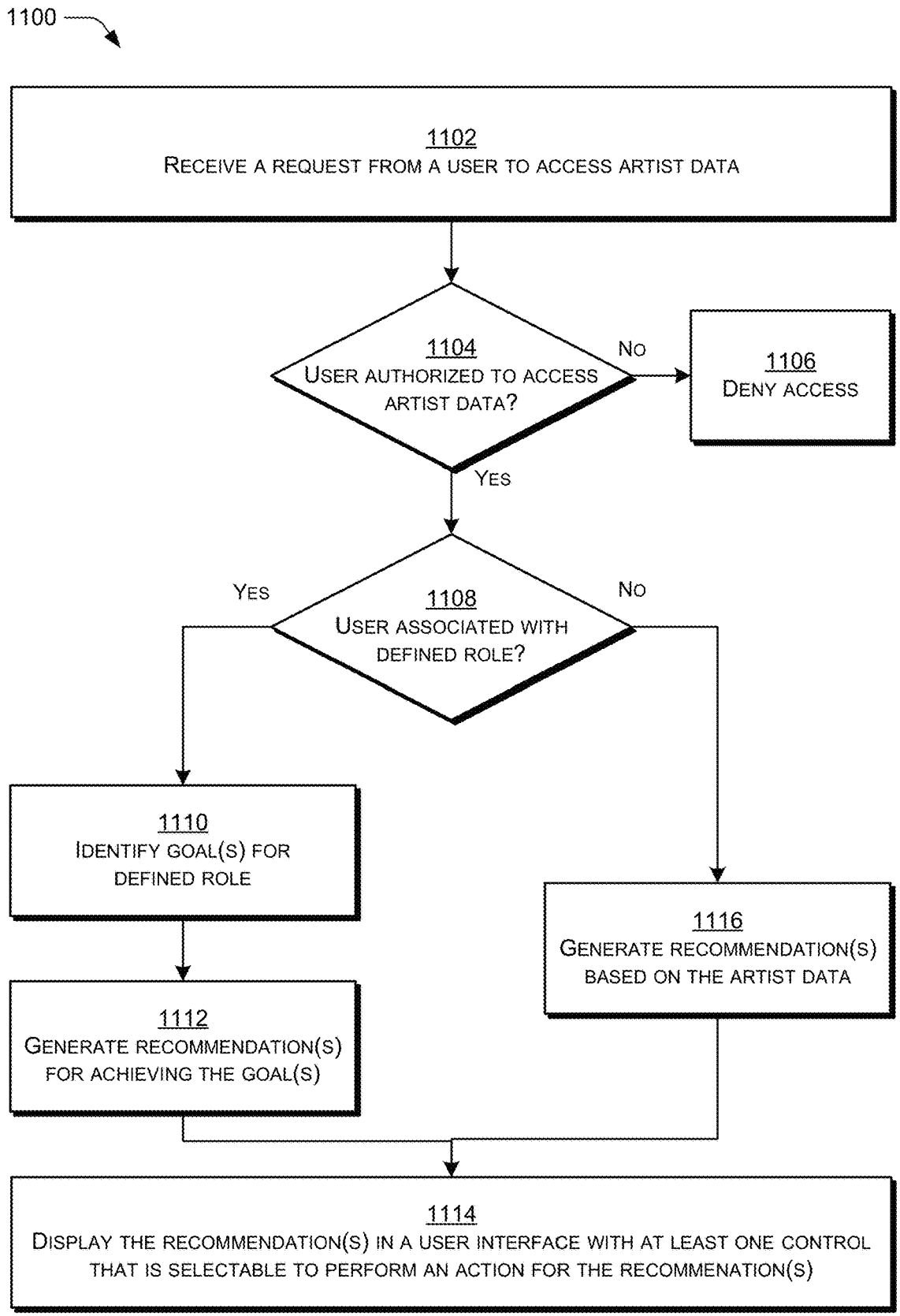
FIG. 11 is a procedure in an example implementation of a recommendation system displaying a recommendation in a user interface with at least one control that is selectable to perform an action for the recommendation.

FIG. 11 is a flow diagram depicting an algorithm as a step-by-step procedure 1100 in an example implementation that is performable by a processing device to generate a recommendation with at least one control that is selectable to perform an action based on artist data.

A request is received from a user to access artist data (block 1102). The media content service provider system 102, for instance, receives a request from computing device 110 to access artist data 128 and/or display a recommendation interface 146, where the request is received with login data 144.

A determination is made as to whether the user is authorized to access the artist data (block 1104). The authentication module 208, for instance, compares entity credentials 210 included in the login data 144 to artist data 128 to determine whether the entity credentials 210 identify an artist associated with the artist data 128 or an authorized agent 142 of the artist. In response to determining that the user is not authorized to access the artist data (e.g., a "No" determination at block 1104), the user is denied access to the artist data 128 (block 1106).

Alternatively, in response to determining that the user is authorized to access the artist data (e.g., a "Yes" determination at block 1104), a determination is made as to whether the user is associated with a defined role (block 1108). In response to verifying that the entity credentials 210 correspond to entity information 212 describing an entity that is authorized to access artist data 128, the authentication module 208 determines whether the entity information 212 specifies a role 214 for the entity.

In response to identifying that the user requesting access is associated with a defined role (e.g., a "Yes" determination at block 1108), one or more goals for the defined role are identified (block 1110). The recommendation system 130, for instance, identifies one or more defined objectives for the authorized agent 142, such as a goal to increase consumption of media content 126, a goal to increase concert attendance and ticket sales, a goal to increase merchandise sales, a goal to increase mentions in media (e.g., news, social media, and other publication platforms), and so forth.

A recommendation is then generated for achieving the one or more goals (block 1112). The recommendation system 130, for instance, selects one or more model(s) 132 that have been trained to output a recommendation 218 for achieving a respective one of the one or more goals and inputs the artist data 128 to the selected model(s) 132. In the absence of a defined goal, the recommendation system 130 defaults to an assumption that the goal is to increase consumption of media content 126 for the artist associated with artist data 128. Inputting the artist data 128 to the selected model(s) 132 causes the model(s) 132 to output the recommendation(s) 218, which are then displayed in a user interface with at least one control that is selectable to perform a recommended action (block 1114). The recommendation system 130, for instance, outputs the recommendation 218 in a recommendation interface 146, such as in one or more of the example recommendation interfaces 146 with respective selectable controls as depicted in the illustrated examples of FIGS. 3-9.

Alternatively, in response to identifying that the user is not associated with a defined role (e.g., a "No" determination at block 1108), the recommendation system 130 defaults to an assumption that the goal is to increase consumption of media content 126 for the artist associated with artist data 128 and generates a recommendation 218 to increase consumption of media content 126 for the artist associated with artist data 128 (block 1116). Operation then proceeds from block 1116 to block 1114, as described above.

Figure 12:
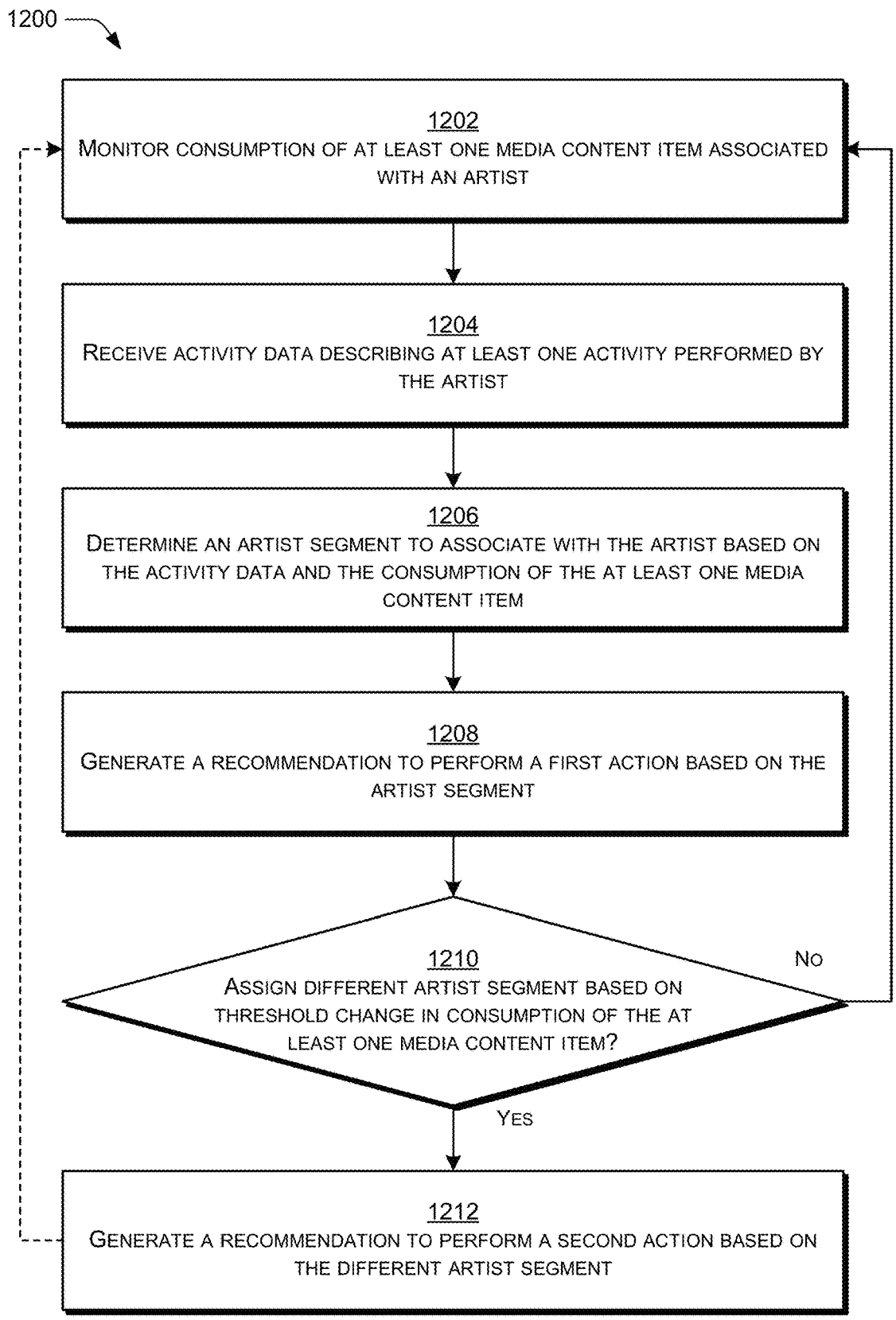
FIG. 12 is a procedure in an example implementation of a recommendation system generating a recommendation for an artist based on an artist segment to which the artist is assigned.

FIG. 12 is a flow diagram depicting an algorithm as a step-by-step procedure 1200 in an example implementation that is performable by a processing device to generate a recommendation for an artist, based on an artist segment to which the artist is assigned, for performing an action.

Consumption of at least one media content item associated with an artist is monitored (block 1202). The media content service provider system 102, for instance, generates artist data 128 describing consumption of one or more media content 126 items associated with an artist 116.

Activity data describing at least one activity performed by the artist is received (block 1204). The media content service provider system 102, for instance, receives artist data 128 from the artist 116, an authorized agent 142 of the artist 116, the service provider system 112, in response to input at a selectable control included in the recommendation interface 146 indicating performance of an action, or combinations thereof. Information describing the at least one activity performed by the artist is added to profile data 138 for an artist profile 136 associated with the artist.

An artist segment to associate with the artist based on the activity data and the consumption of the at least one media content item is determined (block 1206). The recommendation system 130, for instance, causes the artist segmentation module 202 to process the artist data 128 and assign an artist segment 148 to an artist profile 136 associated with the artist (e.g., based on identifying that the artist data 128 satisfies one or more segment thresholds 204, one or more segment trends 206, or combinations thereof, associated with the artist segment 148).

A recommendation to perform a first action based on the artist segment is then generated (block 1208). The recommendation system 130, for instance, selects one or more model(s) 132 trained to output a recommendation 218 for a defined objective (e.g., increasing consumption of media content 126) based on training data generated from artist data for different artists associated with the artist segment 148. After selecting the one or more model(s) 132 trained to do so, the artist data 128 is provided as input to the one or more model(s) 132, which causes the model(s) 132 to output a recommendation 218.

A determination is then made as to whether a different artist segment should be assigned to the artist based on a threshold change in consumption of the at least one media content item (block 1210). The artist segmentation module 202, for instance, determines whether updated artist data 128 for the artist 116 indicates satisfaction of one or more segment thresholds 204, one or more segment trends 206, or combinations thereof, associated with the artist segment 148 that is different from an artist segment to which the artist is currently assigned.

In response to determining that such a threshold change has not occurred (e.g., a "No" determination at block 1210), operation of procedure 1200 returns to block 1202 to account for additional consumption of the media content 126 and/or activities performed by the artist while associated with the originally assigned artist segment 148.

Alternatively, in response to detecting that a threshold change has occurred and that the artist should be associated with a different artist segment (e.g., a "Yes" determination at block 1210), a recommendation to perform a second action is generated based on the different artist segment (block 1212). The recommendation system 130, for instance, selects one or more model(s) 132 trained on training data gleaned from artist data for artists associated with the different artist segment generates training data from the similar artist data 216 for training the model(s) 132 to output a recommendation 218 for a defined objective (e.g., increasing consumption of media content 126) based on information described in the artist data 128. After selecting the one or more model(s) 132 trained based on the different artist segment, the artist data 128 is provided as input to the one or more model(s) 132, which causes the model(s) 132 to output a recommendation 218 that is tailored based on the different artist segment. Operation of the procedure 1200 then optionally returns to block 1202 to account for additional consumption of the media content 126 and/or activities performed by the artist while associated with the different artist segment 148.

Figure 13:
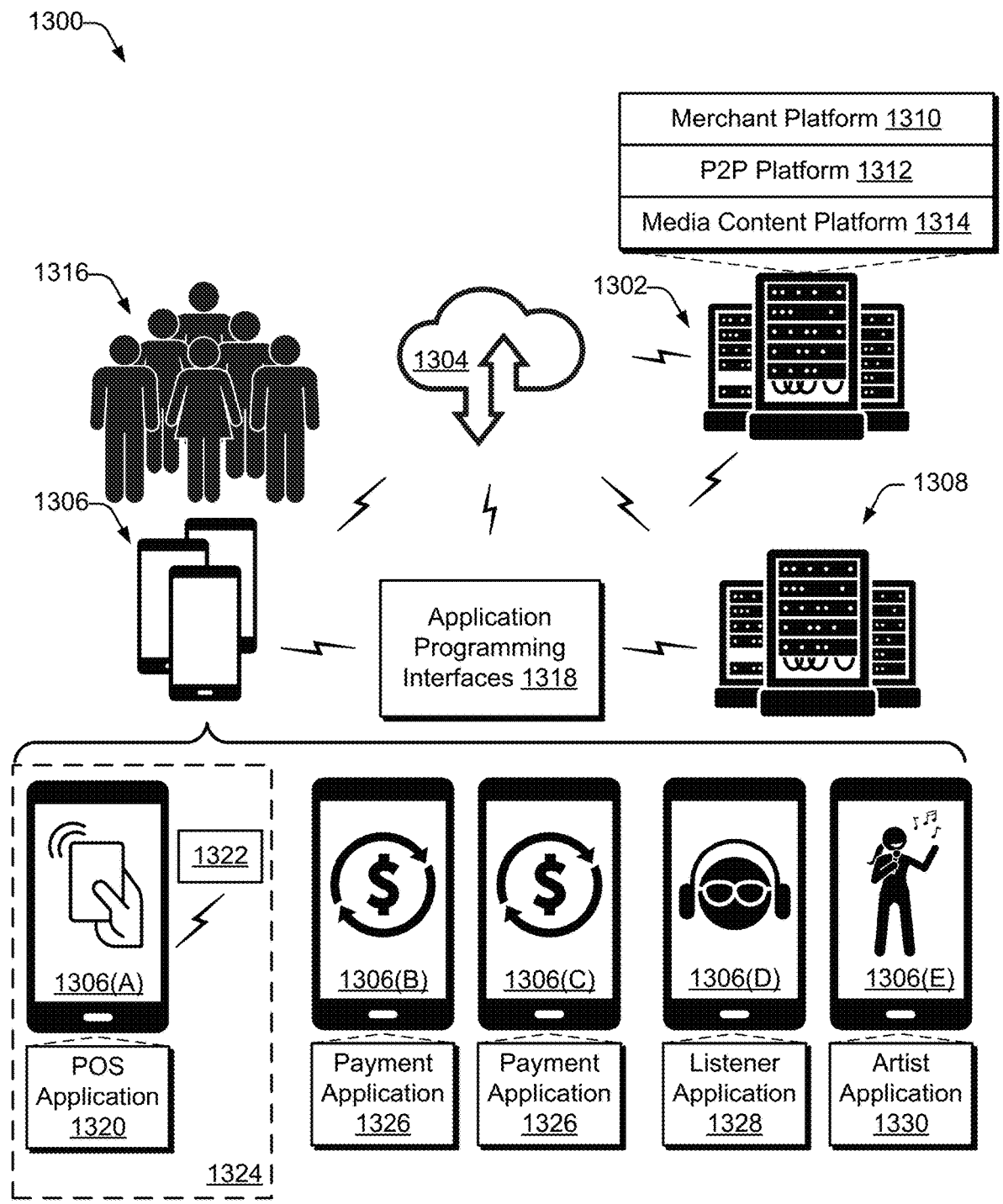
FIG. 13 is a non-limiting example illustrating an environment in which recommendation techniques described herein are performed in accordance with one or more implementations.

FIG. 13 illustrates an example environment 1300 in which recommendation techniques described herein are performed in accordance with one or more implementations.

The environment 1300 includes server(s) 1302 that can communicate over a network 1304 with end user devices 1306 and/or server(s) 1308 associated with third-party service provider(s). In various examples, the end user devices 1306 may comprise one or more seller devices 1306(A), one or more user devices 1306(B) and/or 1306(C) in a peer network, one or more content consumption devices 1306(D), one or more artist devices 1306(E), combinations of these examples, or other categories of user devices. The server(s) 1302 can be associated with one or more service providers that can provide one or more services for the benefit of users 1316, as described below. For example, the server(s) 1302 may enable services of service providers such as in association with a seller platform 1310 (which may further include a buyer platform), a peer-to-peer (P2P) payment platform 1312, a media content platform 1314, a combination of these platforms, or other platforms associated with other service providers. While services and features are referenced throughout in connection with a particular one of the seller platform 1310, the P2P payment platform 1312, or the media content platform 1314, it should be understood that any of these platforms may perform the functionality described in relation to any of the other platforms. Actions attributed to the service provider(s) can be performed by the server(s) 1302.

For instance, the media content platform 1314 is representative of the media content service provider system 102, and as such represents functionality provided by the recommendation system 130 (e.g., to generate recommendation interfaces 146 that include one or more recommendations to perform an action and selectable controls to initiate performance of the recommended actions).

In some examples, individual ones of the end user devices 1306 can be operable by users 1316. The users 1316 (individually referred to herein as "user 1316") can be referred to as customers, buyers, merchants, sellers, borrowers, employees, employers, payors, payees, couriers, artists, musicians, listeners, fans, supervisors, hosts, audience members, and so on. The users 1316 can interact with the end user devices 1306 via user interfaces presented via the end user devices 1306. In at least one example, a user interface can be presented via a web browser, or the like. Alternatively or additionally, a user interface can be presented via an application, such as a mobile application or desktop application, which can be provided by the seller platform 1310, the P2P payment platform 1312, and/or the media content platform 1314, or which can be an otherwise dedicated application. In some examples, individual end user devices 1306 can have an instance or versioned instance of an application, which can be downloaded from an application store, for example, which can present the user interface(s) described herein.

In at least one example, the users 1316 can include merchants that can operate the seller device(s) 1306(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1306(A) can have an instance of a point of sale ("POS") application 1320 stored thereon. The POS application 1320 can configure the seller device 1306(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1320 can determine transaction data associated with the POS transactions. Transaction data can include payment information, which can be obtained from a reader device 1322 associated with the seller device 1306(A), user authentication data, purchase amount information, point-of-purchase information (e.g., item(s) purchased, date of purchase, time of purchase, subscription type, etc.), etc. The POS application 1320 can send transaction data to the server(s) 1302 such that the server(s) 1302 can track transactions of the customers, merchants, and/or the users 1316 over time. Furthermore, the POS application 1320 can present a UI to enable the merchant to interact with the POS application 1320 and/or the seller platform 1310 via the POS application 1320.

In at least one example, the seller device 1306(A) can be a special-purpose computing device configured as a POS terminal (via the execution of the POS application 1320). In at least one example, the POS terminal may be connected to a reader device 1322, which is capable of accepting a variety of payment instruments, such as credit cards, debit cards, gift cards, short-range communication based payment instruments, and the like, as described below. In at least one example, the reader device 1322 can plug in to a port in the seller device 1306(A), such as a microphone port, a headphone port, an audio-jack, a data port, or other suitable port. In additional or alternative examples, the reader device 1322 can be coupled to the seller device 1306(A) via another wired or wireless connection, such as via Bluetooth®, BLE, and so on. In some examples, the reader device 1322 can be a software solution executing on the POS terminal, e.g., a mobile phone. In some examples, the reader device 1322 can read information from alternative payment instruments including, but not limited to, wristbands and the like.

In some examples, the reader device 1322 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1322, and communicate with the seller platform 1310, which can provide, among other services, a payment processing service. The server(s) 1302 associated with the seller platform 1310 can communicate with server(s) 1308, as described below. In this manner, the POS terminal and reader device 1322 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1322 of the POS system 1324 are shown as separate devices, in additional or alternative examples, the POS terminal and the reader device 1322 can be part of a single device. In some examples, the reader device 1322 can have a display integrated therein for presenting information to customers of a merchant. In additional or alternative examples, the POS terminal can have a display integrated therein for presenting information to the customers of the merchant. POS systems, such as the POS system 1324, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1322, whereby the reader device 1322 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1324, the server(s) 1302, and/or the server(s) 1308 may exchange payment information and transaction data to determine whether transactions are authorized. For example, the POS system 1324 may provide encrypted payment data, user authentication data, purchase amount information, point-of-purchase information, etc. (collectively, transaction data) to server(s) 1302 over the network(s) 1304. The server(s) 1302 may send the transaction data to the server(s) 1308.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1308 associated therewith) can forward the fund transfer request to an issuing bank (e.g., "issuer"). The issuer is a bank or financial institution that offers a financial account (e.g., credit or debit card account) to a user. The issuer (e.g., the server(s) 1308 associated therewith) can make a determination as to whether the customer has the capacity to absorb the relevant charge associated with the payment transaction. In at least one example, the seller platform 1310 can serve as an issuer and/or can partner with an issuer. The transaction is either approved or rejected by the issuer and/or the card payment network (e.g., the server(s) 1308 associated therewith), and a payment authorization message is communicated from the issuer to the POS device via a path opposite of that described above, or via an alternate path.

The server(s) 1308 may send an authorization notification over the network(s) 1304 to the server(s) 1302, which may send the authorization notification to the POS system 1324 over the network(s) 1304 to indicate whether the transaction is authorized. The server(s) 1302 may also transmit additional information such as transaction identifiers to the POS system 1324. In one example, the server(s) 1302 may include a merchant application and/or other functional components for communicating with the POS system 1324 and/or the server(s) 1308 to authorize or decline transactions (e.g., the API 1318). In examples, the seller platform 1310 can enable the merchants to receive cash payments, payment card payments, and/or electronic payments from customers for POS transactions and the service provider can process transactions on behalf of the merchants.

Based on the authentication notification that is received by the POS system 1324 from server(s) 1302, the merchant may indicate to the customer whether the transaction has been approved. In some examples, approval may be indicated at the POS system 1324, for example, at a display of the POS system 1324. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1310 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1306 can access all of the services. In some cases, the user devices 1306 can have gradated access to the services, which can be based on risk tolerance, IDV outputs, subscriptions, and so on. In at least one example, access to such services can be availed to the merchants via the POS application 1320. In additional or alternative examples, each service can be associated with its own access point (e.g., application, web browser, etc.).

As the seller platform 1310 processes transactions on behalf of the merchants, the seller platform 1310 can maintain accounts or balances for the merchants in one or more ledgers. For example, the seller platform 1310 can analyze transaction data received for a transaction to determine an amount of funds owed to a merchant for the transaction and deposit funds into an account of the merchant. The account can have a stored balance, which can be managed by the seller platform 1310. The account can be different from a conventional bank account at least because the stored balance is managed by a ledger of the seller platform 1310 and the associated funds are accessible via various withdrawal channels including, but not limited to, scheduled deposit, same-day deposit, instant deposit, and a linked payment instrument.

A scheduled deposit can occur when the seller platform 1310 transfers funds associated with a stored balance of the merchant to a bank account of the merchant that is held at a bank or other financial institution (e.g., associated with the server(s) 1308). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1310 to the bank account of the merchant.

In at least one example, the seller platform 1310 may provide inventory management services. That is, the seller platform 1310 may provide inventory tracking and reporting. Inventory management services may enable the merchant to access and manage a database storing data associated with a quantity of each item that the merchant has available (i.e., an inventory). Furthermore, in at least one example, the seller platform 1310 can provide catalog management services to enable the merchant to maintain a catalog, which can be a database storing data associated with items that the merchant has available for acquisition (i.e., catalog management services). The seller platform 1310 can offer recommendations related to pricing of the items, placement of items on the catalog, and multi-party fulfillment of the inventory, to name a few examples.

In at least one example, the seller platform 1310 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1310 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1310 can provide financing services for offering and/or lending a loan to a borrower that is to be used for, in some instances, financing the borrower's short-term operational needs (e.g., a capital loan). Additionally or alternatively, the seller platform 1310 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1310 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1310 can provide web-development services, which enable users 1316 who are unfamiliar with HTML, XML, JavaScript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1310 can recommend and/or generate content items to supplement omni-channel presences of the merchants.

Furthermore, the seller platform 1310 can provide payroll services to enable employers to pay employees for work performed on behalf of employers. In at least one example, the seller platform 1310 can receive data that includes time worked by an employee (e.g., through imported timecards and/or POS interactions), sales made by the employee, gratuities received by the employee, and so forth. Based on such data, the seller platform 1310 can make payroll payments to employee(s) on behalf of an employer via the payroll service. For instance, the seller platform 1310 can facilitate the transfer of a total amount to be paid out for the payroll of an employee from the bank of the employer to the bank of the seller platform 1310 to be used to make payroll payments. In at least one example, when the funds have been received at the bank of the seller platform 1310, the seller platform 1310 can pay the employee, such as by check or direct deposit.

Moreover, in at least one example, the seller platform 1310 can provide employee management services for managing schedules of employees. Further, the seller platform 1310 can provide appointment services for enabling users 1316 to set schedules for scheduling appointments and/or users 1316 to schedule appointments.

In some examples, the seller platform 1310 can provide restaurant management services to enable users 1316 to make and/or manage reservations, to monitor front-of-house and/or back-of-house operations, and so on. In such examples, the seller device(s) 1306(A) and/or server(s) 1302 can be configured to communicate with one or more other computing devices, which can be located in the front-of-house (e.g., POS device(s)) and/or back-of-house (e.g., kitchen display system(s) (KDS)). In at least one example, the seller platform 1310 can provide order management services and/or fulfillment services to enable restaurants (or other merchant types) to manage open tickets, split tickets, and so on and/or manage fulfillment services.

In some examples, the seller platform 1310 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1310 can leverage other merchants and/or sales channels that are part of the seller platform 1310 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1310 can enable conversational commerce via conversational commerce services, which can use one or more machine learning mechanisms to analyze messages exchanged between two or more users 1316, voice inputs into a virtual assistant or the like, to determine intents of user(s) 1316. In some examples, the seller platform 1310 can utilize determined intents to automate customer service, offer promotions, provide recommendations, or otherwise interact with customers in real-time. In at least one example, the seller platform 1310 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1316 may be new to the seller platform 1310 such that the user 1316 that has not registered (e.g., subscribed to receive access to one or more services offered by the seller platform 1310) with the seller platform 1310. The seller platform 1310 can offer onboarding services for registering a potential user 1316 with the seller platform 1310. In some examples, onboarding can involve presenting various questions, prompts, and the like to a potential user 1316 to obtain information that can be used to generate a profile for the potential user 1316. In at least one example, the seller platform 1310 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1310 can be transitioned to more permissive (e.g., less limited) or longer-term access to such services.

The seller platform 1310 can be associated with IDV services, which can be used by the seller platform 1310 for compliance purposes and/or can be offered as a service, for instance to third-party service providers (e.g., associated with the server(s) 1308). That is, the seller platform 1310 can offer IDV services to verify the identity of users 1316 seeking to use or using their services. Identity verification may involve requesting a customer (or potential customer) to provide information that is used by compliance departments to prove that the information is associated with an identity of a real person or entity (e.g., an artist). In at least one example, the seller platform 1310 can perform services for determining whether identifying information provided by a user 1316 accurately identifies the customer (or potential customer).

Techniques described herein can be configured to operate in both real-time/online and offline modes. "Online" modes refer to modes when devices are capable of communicating with the seller platform 1310 while offline mode refers to modes when devices are unable to communicate with the server(s) 1308 due to network connectivity issue, for example. In such examples, devices may operate in "offline" mode where at least some payment data is stored (e.g., on the seller device(s) 1306(A)) and/or the server(s) 1302 until connectivity is restored and the payment data can be transmitted to the server(s) 1302 and/or the server(s) 1308 for processing.

In at least one example, the seller platform 1310 can be associated with a hub, such as an order hub, an inventory hub, a fulfillment hub and so on, which can enable integration with one or more additional service providers (e.g., associated with the additional server(s) 1308). In some examples, such additional service providers can offer additional or alternative services and the service provider can provide an interface or other computer-readable instructions to integrate functionality of the service provider into the one or more additional service providers.

Turning now to the P2P functionality provided by the environment 1300, the P2P platform 1312 can provide a peer-to-peer payment service that enables peer-to-peer payments between two or more of the users 1316. Two or more of the users 1316 may be considered "peers" in a peer-to-peer interaction, such as a payment. In at least one example, the P2P platform 1312 can communicate with instances of a payment application 1326 (or other access point) installed on end user devices 1306 configured for operation by the users 1316. In an example, an instance of the payment application 1326 executing on a first user device 1306(B) operated by a payor (e.g., one of the users 1316) can send a request to the P2P platform 1312 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1316) via a peer-to-peer payment. In some examples, assets associated with an account of the payor are transferred to an account of the payee. In some examples, assets can be held at least temporarily in an account of the P2P platform 1312 prior to transferring the assets to the account of the payee.

In some examples, the P2P platform 1312 can utilize a ledger system to track transfers of assets between users 1316. FIG. 14, below, provides additional details associated with such a ledger system. The ledger system can enable users 1316 to own fractional shares of assets that are not conventionally available. For instance, a user can own a fraction of a Bitcoin, an NFT, or a stock. Additional details are described herein.

In at least one example, the P2P platform 1312 can facilitate transfers and can send notifications related thereto to instances of the payment application 1326 executing on user device(s) of payee(s). As an example, the P2P platform 1312 can transfer assets from an account of a first user to an account of a second user and can send a notification to the user device 1306(B) of the second user for presentation via a user interface. The notification can indicate that a transfer is in process, a transfer is complete, or the like. In some examples, the P2P platform 1312 can send additional or alternative information to the instances of the payment application 1326 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1312 funds the request to payee on behalf of the payor, to speed up the transfer process and compensate for lags that may be attributed to the payor's financial network.

In some examples, the P2P platform 1312 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1302 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1326 executing on the end user devices 1306. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1312 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 13 or a third-party service provider associated with the server(s) 1308. In examples where the content provider is a third-party service provider, the server(s) 1308 can be accessible via one or more APIs 1318 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1312 (e.g., the P2P platform 1312 offers a chat or messaging service that is within the payment application or accessible via the payment application). In some examples, the messaging application can be external to the P2P platform 1312. (e.g., the messaging application is hosted by a third-party service provider associated with the server(s) 1308, which can be accessible via one or more of the APIs 1318 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1312 can enable users 1316 to perform banking transactions via instances of the payment application 1326. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1312 can enable users to allocate funds between different accounts, sub-accounts, or balances (e.g., spending, saving, different assets, different currencies), etc. Further, users 1316 can configure bill pay, recurring payments, and/or the like using assets associated with their accounts. In some examples, the P2P platform 1312, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1312 enables users to buy and/or sell assets via asset networks such as cryptocurrency networks, securities networks, and/or the like. In some examples, acquisition of such assets can be in whole or fractional shares. The ledger system described below with reference to FIG. 14 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1312 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1312 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1312 can automatically apply the amount of funds associated with the gift card to the transaction.

In some examples, users can configure their account such that when they use their payment instruments, the P2P platform 1312 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1312 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1312 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1312 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1312.

In some examples, components of the environment 1300 may be integrated to enable payments at the point-of-sale using assets associated with user accounts of the P2P platform 1312. As illustrated in the environment 1300, the components can communicate with one another via the network 1304, where one or more APIs 1318 or other functional components can be used to facilitate such communication.

In at least one example, an integration can enable a customer to participate in a transaction via their own computing device (e.g., user device 1306(B)) instead of interacting with a merchant device of a merchant, such as the seller device 1306(A). In such an example, the POS application 1320, associated with a payment processing platform and executable by the seller device 1306(A) of the merchant, can present a Quick Response (QR) code, or other code that can be used to identify a transaction (e.g., a transaction code), in association with a transaction between the customer and the merchant. The QR code, or other transaction code, can be provided to the POS application 1320 via an API 1318 associated with the peer-to-peer payment platform. In an example, the customer can utilize their own computing device, such as the user device 1306(B), to capture the QR code, or the other transaction code, and to provide an indication of the captured QR code, or other transaction code, to server(s) 1302.

Based at least in part on the integration of the peer-to-peer payment platform and the payment processing platform (e.g., via the API 1318), the server(s) 1302 of the seller platform 1310 can exchange communications with a payment application 1326 associated with the P2P platform 1312 and/or the POS application 1320 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1312 and seller platform 1310 (which can be a first- or third-party integration) such that a QR code, or other transaction code, specific to the transaction can be used for providing transaction details, location details, customer details, or the like to a computing device of the customer, such as the user device 1306(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1306(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1320 and the payment application 1326, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1306(B), can be specially configured as a buyer-facing device having functionality similar to the functionality described above in the brick-and-mortar example.

In some examples, based at least in part on capturing the QR code, or other transaction code, the seller platform 1310 can provide transaction data to the P2P platform 1312 for presentation via the payment application 1326 on the computing device of the customer, such as the user device 1306B (B), to enable the customer to complete the transaction via their own computing device. In some examples, in response to receiving an indication that the QR code, or other transaction code, has been captured or otherwise interacted with via the customer computing device, the P2P platform 1312 can determine that the customer authorizes payment of the transaction using funds associated with a stored balance of the customer that is managed and/or maintained by the P2P platform 1312. Such authorization can be implicit such that the interaction with the transaction code can imply authorization of the customer. Alternatively or additionally, the P2P platform 1312 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1312 can transfer funds from the stored balance of the customer to the seller platform 1310. In at least one example, the seller platform 1310 can deposit the funds, or a portion thereof, into a stored balance of the merchant that is managed and/or maintained by the seller platform 1310. In such an example, the seller platform 1310 can be a "peer" to the customer in a peer-to-peer transaction.

In some examples, techniques described herein can enable the customer to interact with the transaction after payment for the transaction has been settled. For example, in at least one example, the seller platform 1310 can cause a total amount of a transaction to be presented via a user interface associated with the payment application 1326 such that the customer can provide gratuity, feedback, loyalty information, or the like, via an interaction with the user interface. In another example, the seller platform 1310 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1312, if the customer inputs a tip and/or an event affecting the total amount of the transaction is triggered, the P2P platform 1312 can transfer additional funds, associated with the tip or event, to the seller platform 1310. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1326 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1312 as described herein (e.g., a debit card linked to a stored balance of a customer) such that when the payment instrument is caused to interact with a payment reader, the seller platform 1310 can exchange communications with the P2P platform 1312 to authorize payment for a transaction and/or provision associated transaction data to a computing device of the customer associated with the transaction.

Turning now to media content functionality provided by the environment 1300, the media content platform 1314 can provide digital media to a content consumption device 1306(D) where playback may occur using "streaming." In examples, "streaming" media content involves encoding the media content and transmitting the encoded media content over the network 1304 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1314 can provide a digital media streaming service (e.g., subscription-based, non-subscription-based) that enables a content consumption device 1306(D) to stream and/or download digital media content via a listener application 1328 installed on the content consumption device 1306(D). For instance, the media content platform 1314 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1306(D), the listener application 1328 may verify access rights to the digital media content items at time intervals, for instance intermittently (e.g., when the content consumption device 1306(D) has a network connection with the media content platform 1314 via the network(s) 1304), and/or at regular intervals (e.g., daily, weekly, monthly, etc.). In examples, access rights to the digital media content items may be provided when a subscription to the media content platform 1314 is active, while access rights to the digital media content items may be withheld when the subscription to the media content platform 1314 is terminated. Enabling storage on the end user devices 1306 and subsequent access to digital media content items via the listener application 1328 provides the users 1316 with the ability to access the digital media content items "offline" such as when a connection to the media content platform 1314 via the network(s) 1304 is unavailable or unreliable.

In some examples, the media content platform 1314 may additionally or alternatively provide an artist management service that enables the users 1316 to manage aspects of artist business via an artist application 1330 installed on the artist device 1306(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1316 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1316 may have access to a single user account via respective end user devices 1306, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1330 and the listener application 1328 may be distinct applications having differing user experiences and verification processes for access, such as illustrated in the environment 1300. For instance, the media content platform 1314 may request additional verification, such as a link to an artist website, a sample of an artist's work, a verified credential supplied by a third party, etc. to grant access to the artist application 1330 in addition to information requested to access the listener application 1328. Further, the artist application 1330 may provide the artist management services described herein, without the subscription-based digital media streaming services described herein, and vice versa. However, examples are also considered in which functionality provided by the artist application 1330 and the listener application 1328 partially or fully overlap, and/or where verification processes for access are substantially similar.

In at least some examples, the media content platform 1314 enables interaction between the users 1316 utilizing the listener application 1328 installed on the content consumption devices 1306(D), and the users 1316 utilizing the artist application 1330 installed on the artist devices 1306 (E). For example, the media content platform 1314 may provide interconnectivity between the subscription-based digital media streaming service and the artist management service. Functionality provided by the media content platform 1314 in such instances may include a communication channel between one or more of the users 1316 (e.g., a listener, fan, music supervisor, publisher, etc.) utilizing the listener application 1328 and another user (e.g., an artist) of the users 1316 utilizing the artist application 1330. The communication channel may include, for instance, a messaging platform (also referred to as a "messaging application" herein), a live streaming platform, a videoconferencing or teleconferencing platform, and/or a combination of these.

Additionally, in some cases, the media content platform 1314 may facilitate a resource transfer between the listener application 1328 and the artist application 1330. In an example, the media content platform 1314 may direct a resource, such as a portion of a subscription fee paid by one of the users 1316 designated as a listener, to one or more of the users 1316 designated as artists based on a number of instances that the listening user consumed (e.g., streamed, downloaded, etc.) content created by respective ones of the artist users. Alternatively or additionally, the media content platform 1314 may direct a resource, such as funds, from an account associated with a listening user to an account associated with an artist user (or vice versa), in accordance with transfers between accounts as described herein. The media content platform 1314 may facilitate resource transfers in examples such as merchandise purchases, event ticket purchases, "tipping" an artist, payments for royalties or other fees, and so forth.

In some examples, the media content platform 1314 enables interaction between individual ones of the users 1316 with one another via the listener application 1328 installed on the content consumption device 1306(D) and other of the content consumption devices 1306(D) via a communication channel as described above. In an example, the listener application 1328 may provide functionality via a communication channel for a user to stream an individual digital media item, a playlist, or the like to an audience comprising other ones of the content consumption devices 1306(D). Alternatively or additionally, the communication channel may facilitate sharing of individual digital media items, playlists, user and/or artist profiles, and the like between the users 1316 via messages, uniform resource locators (URLs), quick response (QR) codes, and so forth.

In some cases, the media content platform 1314 enables interaction between individual ones of the users 1316 with one another via the artist application 1330 installed on the artist device 1306(E) and other of the artist devices 1306 via a communication channel as described above. In some instances, the media content platform 1314 may provide recommendations for a particular user indicating which of the other users 1316 to communicate with. Such a recommendation may be based on a similarity (or dissimilarity) of content created by two or more of the users 1316, an overlap (or lack thereof) of audience members of the users 1316, a geographic location of the users 1316, a coinciding event location of the users 1316, and so forth. In some examples, a user may input parameters for a desired connection via the artist application 1330, and the media content platform 1314 may filter which of the users 1316 to surface for recommendations to the user based on the input parameters. Alternatively or additionally, the media content platform 1314 may implement one or more machine learning models to filter which of the users 1316 to surface for recommendations to the user. The recommendations provided by the media content platform 1314 may be data driven and thus increase relevance of communications presented to the users 1316 and reduce unsolicited communications that may be received by the users 1316.

The media content platform 1314 may interact with the server(s) 1308 associated with the third-party service providers to, for instance, ingest digital media items, report digital media consumption data, pay royalties, and the like. In some examples, the server(s) 1308 may be accessible by the media content platform 1314 via one or more APIs 1318 or other integrations. In some cases, the third-party service provider may be a digital media content provider (e.g., a record label, a performance rights organization (PRO), an independent artist, etc.). In such cases, the media content platform 1314 may receive digital media content items from the server(s) 1308, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1314 may use the metadata to associate the digital media content item as being created by a particular user, to provide search results to the users 1316, to generate playlists, and so forth. Further, the media content platform 1314 may provide payments (e.g., royalties) to the third-party service provider based on a number of streams and/or downloads of individual digital media content items by the users via the listener application 1328.

Techniques described herein are directed to services provided via a distributed system of end user devices 1306 that are in communication with server(s) 1302 of the service provider. That is, techniques described herein are directed to a specific implementation—or, a practical application—of utilizing a distributed system of end user devices 1306 that are in communication with server(s) 1302 of the seller platform 1310, the P2P platform 1312, and/or the media content platform 1314 to perform a variety of services, as described above. The unconventional configuration of the distributed system described herein enables the server(s) 1302 that are remotely-located from end-users (e.g., users 1316) to intelligently offer services based on aggregated data associated with the end-users, such as the users 1316 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1310, the P2P platform 1312, and/or the media content platform 1314, and those outside of the control of these service providers, to track the standing (payables, receivables, payroll, invoices, appointments, capital, balances, collaborations, etc.) of the users 1316. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1316 and end user devices 1306. Furthermore, such features are changed dynamically based on the profiles of the users involved interacting with the GUIs. As such, techniques described herein are directed to improvements to computing systems.

The seller platform 1310, the P2P platform 1312, and/or the media content platform 1314 are capable of providing additional or alternative services, and the services described above are offered as a sampling of services. In at least one example, the seller platform 1310, the P2P platform 1312, and/or the media content platform 1314 can exchange data with the server(s) 1308 associated with third-party service providers. Such third-party service providers can provide information that enables the seller platform 1310, the P2P platform 1312, and/or the media content platform 1314 to provide services, such as those described above. In additional or alternative examples, such third-party service providers can access services of the seller platform 1310, the P2P platform 1312, and/or the media content platform 1314. That is, in some examples, the third-party service providers can be subscribers, or otherwise access, services of the seller platform 1310, the P2P platform 1312, and/or the media content platform 1314.

Figure 14:
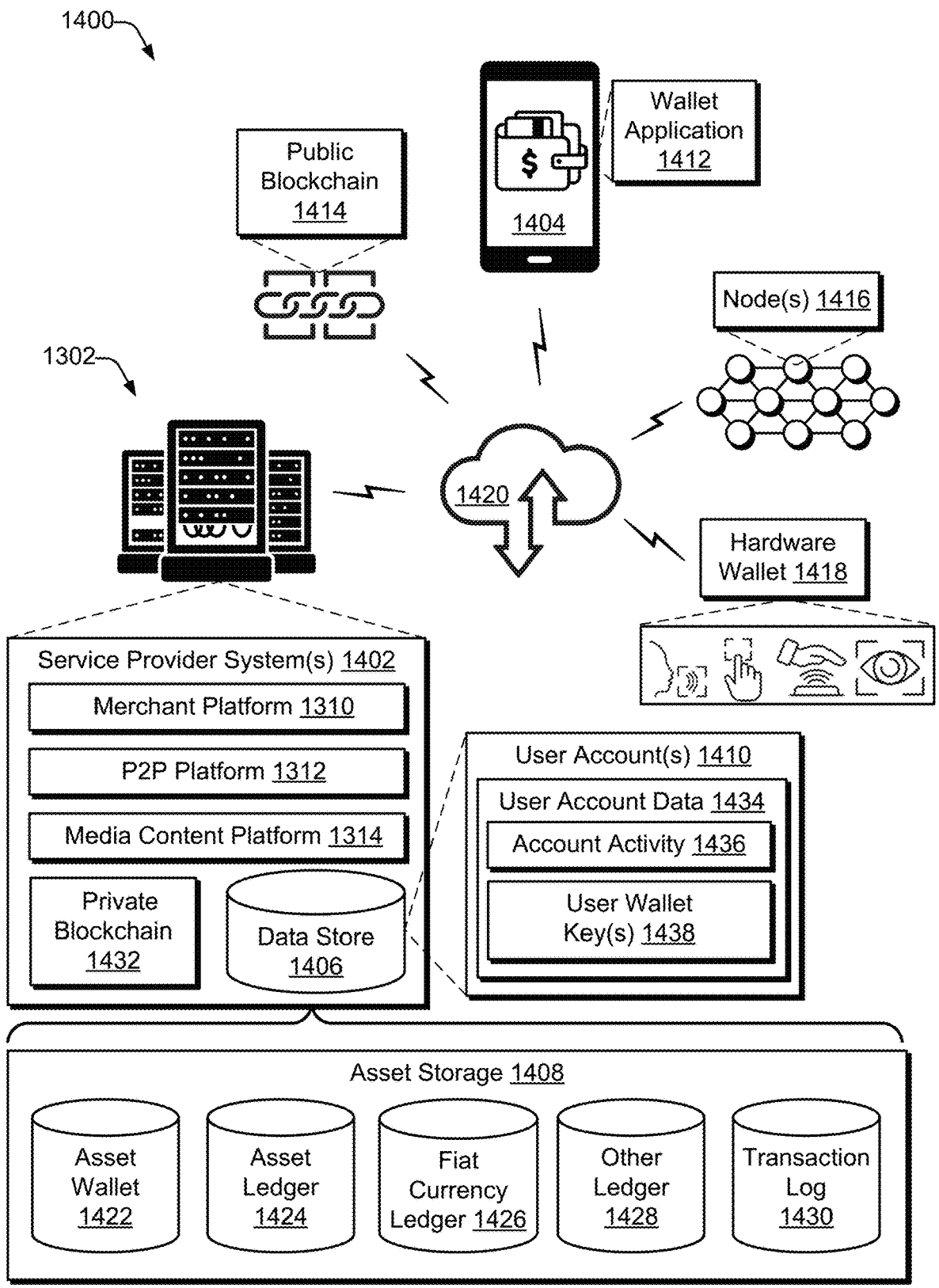
FIG. 14 is a non-limiting example illustrating an environment in which recommendation techniques described herein are performed in accordance with one or more implementations.

FIG. 14 illustrates an example environment 1400 including a service provider system 1402 which may be associated with the server(s) 1302 of FIG. 13. The environment 1400 may also include a user device 1404, which may correspond to any of the end user devices 1306 described in relation to FIG. 13. In examples, the service provider system 1402 may include one or a combination of the seller platform 1310, the P2P platform 1312, or the media content platform 1314, as well as one or more data store(s) 1406 that can store assets in an asset storage 1408, as well as data in user account(s) 1410. In some examples, the environment 1400 may also include a public blockchain 1414, one or more nodes 1416, and/or a hardware wallet 1418. The service provider system 1402, the user device 1404, public blockchain 1414, the node(s) 1416, and the hardware wallet 1418 may be connected and able to communicate via one or more networks 1420, which may have the same or similar functionality described in relation to the network 1304 of FIG. 13.

In some examples, user account(s) 1410 can include merchant account(s), customer account(s), media content subscriber account(s), artist account(s), and so forth. In at least one example, the asset storage 1408 can be used to record whether individual assets are registered to a user account 1410. For example, the asset storage 1408 can include asset wallet(s) 1422 for storing records of assets owned by the service provider system 1402, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1308 of FIG. 13 can be associated therewith.

The asset wallet 1422 can be associated with one or more addresses and can vary addresses used to acquire assets (e.g., from the asset network(s)) so that its holdings are represented under a variety of addresses on the asset network. In examples where the service provider system 1402 has holdings of cryptocurrency (e.g., in the asset wallet 1422), a user can acquire cryptocurrency directly from the service provider system 1402. In some examples, the service provider system 1402 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1402 can provide the same or similar functionality for securities or other assets.

The asset storage 1408 may contain ledgers that store records of assignments of assets to users 1316. Specifically, the asset storage 1408 may include asset ledger 1424, fiat currency ledger 1426, and/or other ledger(s) 1428, which can be used to record transfers of assets between users 1316 and/or one or more third-parties (e.g., merchant network(s), payment card network(s), ACH network(s), equities network(s), the asset network, securities networks, etc.). In doing so, the asset storage 1408 can maintain a running balance of assets managed by the service provider system 1402. The ledger(s) of the asset storage 1408 can further indicate some of the running balance for individual ledger(s) stored in the asset storage 1408 are assigned or registered to one or more user account(s) 1410.

In at least one example, the asset storage 1408 can include transaction logs 1430, which can include, as transaction data, records of past transactions involving the service provider system 1402 and/or the user account 1410. In some examples, the data store(s) 1406 can store a private blockchain 1432. A private blockchain 1432 can function to record sender addresses, recipient addresses, public keys, values of cryptocurrency transferred, and/or can be used to verify ownership of cryptocurrency tokens to be transferred. In some examples, the service provider system 1402 can record transactions involving cryptocurrency until the number of transactions has exceeded a determined limit (e.g., number of transactions, storage space allocation, etc.). Based at least in part on determining that the limit has been reached, the service provider system 1402 can publish the transactions in the private blockchain 1432 to the public blockchain 1414 (e.g., associated with the asset network), where miners can verify the transactions and record the transactions to blocks on the public blockchain 1414. In at least one example, the service provider system 1402 can participate as miner(s) at least for transactions to which the respective platform is a party to, to be posted to the public blockchain 1414.

In some cases, the data store(s) 1406 can store and/or manage multiple user accounts, an example of which is described in relation to the user account 1410. In at least one example, the user account 1410 can include user account data 1434, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1434 can include account activity 1436 and user wallet key(s) 1438. In some examples, the user wallet key(s) 1438 can include a public-private key-pair and a respective address associated with the asset network or other asset networks. In some examples, the user wallet key(s) 1438 may include one or more key pairs, which can be unique to the asset network or other asset networks.

In addition to the user account data 1434, the user account 1410 can include ledger(s) for account(s) managed by the service provider system 1402, for the user. For example, the user account 1410 may include an asset ledger 1424, a fiat currency ledger 1426, and/or one or more other ledgers 1428. The ledger(s) can indicate that a corresponding user utilizes the service provider system 1402 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1402.

In some examples, the asset ledger 1424 can store a balance for each of one or more cryptocurrencies (e.g., Bitcoin, Ethereum, Litecoin, etc.) registered to the user account 1410. In at least one example, the asset ledger 1424 can further record transactions of cryptocurrency assets associated with the user account 1410. For example, the user account 1410 can receive cryptocurrency from the asset network using the user wallet key(s) 1438. In some examples, the user wallet key(s) 1438 may be generated for the user upon request. User wallet key(s) 1438 can be requested by the user in order to send, exchange, or otherwise control the balance of cryptocurrency held by the service provider system 1402 (e.g., in the asset wallet 1422) and registered to the user. In some examples, the user wallet key(s) 1438 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1402 and the value is credited as a balance in asset ledger 1424), by purchasing currency in the form associated with the account using currency in a different form (e.g., buying a value of cryptocurrency from the service provider system 1402 using a value of fiat currency reflected in fiat currency ledger 1426, and crediting the value of cryptocurrency in asset ledger 1424), or by conducting a transaction with another user (customer or merchant) of the service provider system 1402 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1402 (i.e., an external account). Such a transaction can request that the user to transfer an amount of the cryptocurrency in a message signed by user's private key to an address provided by the service provider system 1402. In at least one example, the transaction can be sent to miners to bundle the transaction into a block of transactions and to verify the authenticity of the transactions in the block. Once a miner has verified the block, the block is written to the public blockchain 1414 where the service provider system 1402 can then verify that the transaction has been confirmed and can credit the user's asset ledger 1424 with the transferred amount. When an account is funded by transferring cryptocurrency from a third-party cryptocurrency wallet, an update can be made to the public blockchain 1414. In some cases, this update of the public blockchain 1414 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1402. As described above, in some examples, the service provider system 1402 can acquire cryptocurrency from a third-party source. In examples where the service provider system 1402 has its own cryptocurrency assets, cryptocurrency transferred in a transaction (e.g., data with address provided for receipt of transaction and a balance of cryptocurrency transferred in the transaction) can be stored in an asset wallet 1422 associated with the service provider system 1402. In at least one example, the service provider system 1402 can credit the asset ledger 1424 of the user. Additionally, while the service provider system 1402 recognizes that the user retains the value of the transferred cryptocurrency through crediting the asset ledger 1424, an inspection of the blockchain will show the cryptocurrency as having been transferred to the service provider system 1402. In some examples, the asset wallet 1422 can be associated with many different addresses. In such examples, an inspection of the blockchain may not necessarily associate all cryptocurrency stored in asset wallet 1422 as belonging to the same entity. The presence of a private ledger used for real-time transactions and maintained by the service provider system 1402, combined with updates to the public ledger at other times, allows for extremely fast transactions using cryptocurrency to be achieved. In some examples, the "private ledger" can refer to the asset ledger 1424, which in some examples, can utilize the private blockchain 1432, as described herein. The "public ledger" can correspond to the public blockchain 1414 associated with the asset network.

In at least one example, an asset ledger 1424, fiat currency ledger 1426, or the like associated with the user account 1410 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1424. In some examples, a user can receive fiat currency or another currency in the form of payment for a transaction with another user. In at least one example, at least a portion of such funds can be converted into cryptocurrency by the service provider system 1402 and used to fund the asset ledger 1424 of the user.

In examples, a user can also have an account in U.S. dollars, which can be tracked, for example, via the fiat currency ledger 1426. Such an account can be funded by transferring money from a bank account at a third-party bank to an account maintained by the service provider system 1402 as is conventionally known. In some examples, a user can receive fiat currency in the form of payment for a transaction with another user. In such examples, at least a portion of such funds can be used to fund the fiat currency ledger 1426.

In some examples, a user can have one or more internal payment cards registered with the service provider system 1402. Internal payment cards can be linked to one or more of the accounts associated with the user account 1410. In some embodiments, options with respect to internal payment cards can be adjusted and managed using an application (e.g., the payment application 1326, a wallet application 1412, etc.).

In at least one example, the user account 1410 can be associated with the asset wallet accessible via a wallet application 1412 of the user device 1404, or a stored balance for use in payment transactions, peer-to-peer transactions, payroll payments, etc. In at least one example, the asset wallet 1422 can store data indicating an address provided for receipt of a cryptocurrency transaction. In at least one example, the balance of the asset wallet 1422 can be based at least in part on a balance of the asset ledger 1424. In at least one example, funds availed via the asset wallet 1422 can be stored in the asset wallet 1422. Funds availed via the asset wallet 1422 can be tracked via the asset ledger 1424.

The asset wallet 1422, however, can be associated with additional cryptocurrency funds.

In at least one example, when the service provider system 1402 includes a private blockchain 1432 for recording and validating cryptocurrency transactions, the asset wallet 1422 can be used instead of, or in addition to, the asset ledger 1424. For example, a merchant can provide the address of the asset wallet 1422 for receiving payments. In an example where a customer is paying in cryptocurrency and the customer has their own cryptocurrency wallet account associated with the service provider system 1402, the customer can send a message signed by its private key including its wallet address (i.e., of the customer) and identifying the cryptocurrency and value to be transferred to the merchant's asset wallet 1422. The service provider system 1402 can complete the transaction by reducing the cryptocurrency balance in the customer's cryptocurrency wallet and increasing the cryptocurrency balance in the merchant's asset wallet 1422. In addition to recording the transaction in the respective cryptocurrency wallets, the transaction can be recorded in the private blockchain 1432 and the transaction can be confirmed. A user can perform a similar transaction with cryptocurrency in a peer-to-peer transaction as described above.

While the asset ledger 1424 and/or asset wallet 1422 are each described above with reference to cryptocurrency, the asset ledger 1424 and/or asset wallet 1422 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1402 is an aspect of the technology disclosed that enables technical advantages of increased processing speed and improved security.

The description of the environment 1400 above generally relates to a centralized service provider that at least partially facilitates storing and managing assets in the data store 1406. However, the environment 1400 may also facilitate decentralized storage and management of assets alternatively or in addition to centralized storage and management as described above. For instance, the environment 1400 may include a decentralized platform implemented using a plurality of nodes (e.g., web nodes), an example of which is illustrated as node 1416. The node 1416 is representative of a computer or other device tasked with validating transactions and/or maintaining a copy of a blockchain ledger, such as a ledger associated with the public blockchain 1414. The decentralized platform may be implemented via the environment 1400 through use of decentralized identifiers and verifiable credentials that are stored and managed by user devices 1404. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1402). The decentralized identity referenced by a decentralized identifier gives an entity control over what data can be accessed, stored, modified, and so forth by other entities, such as the service provider system 1402.

The node 1416, as representative of one of a plurality of decentralized nodes (e.g., decentralized web nodes), supports data storage and relays that allows entities, service provider systems, individuals, organizations and so forth to send, store, and receive encrypted or public messages and data. The node 1416 is universally addressable and is "crawlable" using data addressing in relation to the decentralized identifiers. The node 1416 is also configured to support decentralized replication of data across the nodes that is consistent across multiple nodes over time through continued data communication between the nodes in the decentralized platform. The node 1416 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1404 may be an issuer, a holder, and/or a verifier, as can the service provider system 1402.

In some examples, the user device 1404 may implement a wallet application 1412 configured to manage decentralized identifiers and/or verifiable credentials. For instance, the wallet application 1412 may provide a user interface for implementation of access controls to various data associated with the decentralized identifier by the service provider system 1402, to other user devices, and so forth. Additionally, the wallet application 1412 may be configured to provide functionality for resource transfers (e.g., cryptocurrency, fiat currency, etc.) with the service provider system 1402, other user devices, and the like, based on techniques described herein.

In some examples, the hardware wallet 1418 may store cryptocurrency assets in combination with the wallet application 1412 and the service provider system 1402. For instance, the hardware wallet 1418, the wallet application 1412, and the service provider system 1402 may each store a respective, different private key, where a transaction with the cryptocurrency assets is signed by at least two of the three private keys. The user interface provided by the wallet application 1412 may allow a user to request a transaction. The wallet application 1412 may then sign the transaction with the private key of the wallet application 1412, have either the hardware wallet 1418 or the service provider system 1402 use a second of the three private keys to sign the transaction, and then provide the transaction with two signatures to the public blockchain 1414 for processing.

Figure 15:
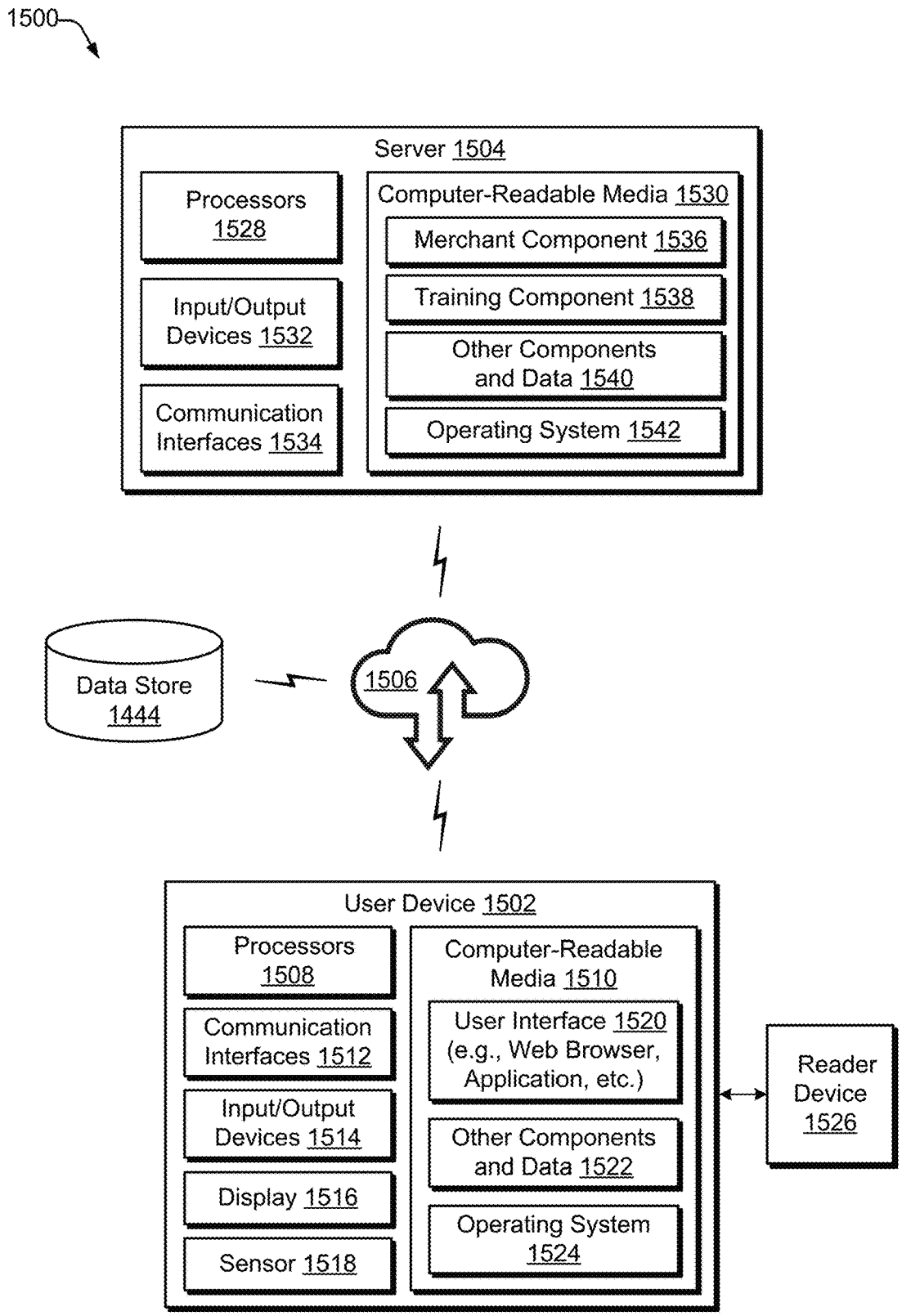
FIG. 15 is a non-limiting example illustrating an environment in which recommendation techniques described herein are performed in accordance with one or more implementations.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 13.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below. The user device 1502 may be representative of, and provide functionality for, the user devices 1306 described in relation to FIG. 13.

In the illustrated example, the user device 1502 includes one or more processors 1508, one or more computer-readable media 1510, one or more communication interface(s) 1512, one or more input/output (I/O) devices 1514, a display 1516, sensor(s) 1518, one or more encoders 1546, and one or more decoders 1548.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, components or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In some examples, the user interface 1520 can be the recommendation interface 146, such as the example user interfaces described and illustrated with respect to FIGS. 3-9. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, user movement tracking techniques, eye tracking techniques, etc. to determine context or intent of the user, which may be treated in a manner similar to "direct" user input.

Depending on the type of the user device 1502, the computer-readable media 1510 can also optionally include other functional components and data, such as other components and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtual reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. In some examples, the user device 1502 may not include the display 1516, and information can be presented by other means, such as aurally, haptically, etc.

In addition, the user device 1502 can include sensor(s) 1518. The sensor(s) 1518 can include a global positioning system ("GPS") device able to indicate location information. Further, the sensor(s) 1518 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1310, the P2P platform 1312, and/or the media content platform 1314, described above, to provide one or more services. That is, in some examples, the service provider can implement geofencing to provide particular services to users by the seller platform 1310, the P2P platform 1312, and/or the media content platform 1314.

In examples, the user device 1502 includes a codec system, which may comprise an encoder 1546 and/or a decoder 1548. The encoder 1546 is configured to encode a data stream or signal from an analog signal (e.g., an analog audio signal, an analog video signal, etc.) to a digital signal for transmission or storage. The decoder 1548 is configured to convert the digital signal back to an analog signal, such as for playback or editing. In some cases, the encoder 1546 may be configured to encode the data stream or analog signal in an encrypted format, and the decoder 1548 may accordingly be configured to decrypt the digital signal as part of the decoding process (e.g., using a cryptographic key). Additionally, in some examples, the encoder 1546 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1546 and/or the decoder 1548 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1500, the server 1504 may include an encoder 1546 and/or a decoder 1548 as well.

Additionally, the user device 1502 can include various other components that are not shown, examples of which include removable storage, a power source, such as a battery and power control unit, a barcode scanner, a printer, a cash drawer, and so forth.

In addition, as described in relation to FIG. 13, the user device 1502 can include, be connectable to, or otherwise be coupled to a reader device 1526, for reading payment instruments and/or identifiers associated with payment objects. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe, a dip, or a tap to obtain payment data associated with a customer. Additionally or optionally, the reader device 1526 may also include a biometric sensor to receive and process biometric characteristics and process them as payment instruments, given that such biometric characteristics are registered with the payment service and connected to a financial account with a bank server. The reader device 1526 may include processing unit(s), computer-readable media, a reader chip, a transaction chip, a timer, a clock, a network interface, a power supply, and so on. That is, the reader device 1526 may include any of the computing components described herein with reference to the user device 1502 to implement the functionality provided by the reader device 1526.

In examples, the reader device 1526 includes a reader chip, which may perform functionality to control the power supply, among other functionality of the reader device 1526. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The reader device 1526 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1502, which can be a POS terminal, and the reader device 1526 are shown as separate devices, in additional or alternative examples, the user device 1502 and the reader device 1526 can be part of a single device, which may be a battery-operated device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program components, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the seller platform 1310, the P2P platform 1312, and/or the media content platform 1314. Functional components stored in the computer-readable media 1530 can optionally include a merchant component 1536, a training component 1538, and one or more other components and data 1540. The computer-readable media 1530 can additionally include an operating system 1542 for controlling and managing various functions of the server(s) 1504, such as functionality provided by the recommendation system 130.

The merchant component 1536 can be configured to receive transaction data from POS systems, such as the POS system 1324 described above with reference to FIG. 13. The merchant component 1536 can transmit requests (e.g., authorization, capture, settlement, etc.) to payment service server computing device(s) to facilitate POS transactions between merchants and customers. The merchant component 1536 can communicate the successes or failures of the POS transactions to the POS systems.

The training component 1538 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other components and data 1540 can include the recommendation system 130, the model(s) 132, and the correlation engine 134, the functionality of which is described above. Further, the one or more other components and data 1540 can include programs, drivers, etc., and the data used or generated by the functional components. Further, the server(s) 1504 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, as described herein.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506. In at least one example, the datastore 1544 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

In some aspects, the techniques described herein relate to a method including monitoring, by a media content platform, consumption of at least one media content item associated with an artist, by multiple user accounts, on the media content platform, generating data for the artist that describes the consumption of the at least one media content item by the multiple user accounts, receiving a request to access the data for the artist, the request including credentials associated with an originator of the request, validating that the credentials associated with the originator of the request are associated with an entity authorized by the artist to access the data for the artist, and in response to validating that the originator of the request is authorized to access the data for the artist identifying a role associated with the originator of the request, configuring a user interface that presents a subset of the data for the artist based on the role associated with the originator of the request and includes at least one action item to be performed based on the subset of the data, and displaying the user interface at a computing device.

In some aspects, the techniques described herein relate to a method, further including receiving a different request to access the data for the artist, the request including different credentials associated with an originator of the different request, in response to validating that the originator of the different request is authorized to access the data for the artist identifying a role associated with the originator of the different request, configuring a different user interface that presents a different subset of the data for the artist based on the role associated with the originator of the different request and includes at least one other action item to be performed based on the different subset of the data, and displaying the different user interface at a computing device.

In some aspects, the techniques described herein relate to a method, wherein configuring the user interface includes generating a selectable control for the at least one action item to be performed based on the subset of the data and initiating performance of the at least one action item in response to detecting input at the selectable control.

In some aspects, the techniques described herein relate to a method, wherein initiating performance of the at least one action item includes initiating performance of an action on a platform other than the media content platform.

In some aspects, the techniques described herein relate to a method, wherein the role associated with the originator of the request includes a booking agent and the at least one action item includes booking a venue for the artist, wherein the venue is identified by the media content platform based on the data for the artist.

In some aspects, the techniques described herein relate to a method, wherein the role associated with the originator of the request includes a manager and the at least one action item includes increasing an inventory of goods for the artist, wherein a type of the goods is recommended by the media content platform based on the data for the artist.

In some aspects, the techniques described herein relate to a method, further including receiving input at the user interface requesting refinement of the subset of the data for the artist derived from a portion of the multiple user accounts sharing a characteristic and updating the user interface to display a portion of the subset of the data for the artist derived from the portion of the multiple user accounts sharing the characteristic.

In some aspects, the techniques described herein relate to a method, further including receiving an indication that the at least one action item was performed, and modifying the user interface to display at least one insight describing how performance of the at least one action item affected consumption of the at least one media content item associated with the artist.

In some aspects, the techniques described herein relate to a method, wherein the at least one action item is to be performed is further identified based on data obtained from a platform other than the media content platform. The second independent claim (claim 10) is a sequence further covers generating a second recommendation based on consumption data monitored during the second time period (e.g., based on consumption data describing a response to an action performed based on the recommendation generated from the first time period).

In some aspects, the techniques described herein relate to a method including monitoring, by a media content platform over a first time period, consumption of at least one media content item associated with an artist, by multiple user accounts, on the media content platform, generating first artist data for the artist that describes the consumption of the at least one media content item by the multiple user accounts over the first time period, receiving, by the media content platform, activity data associated with at least one activity performed by the artist, determining an artist segment to associate with the artist based on the first artist data and the activity data, generating a first recommendation of a first action for the artist to take to increase the consumption of the at least one media content item based on the artist segment, outputting the first recommendation in a user interface by a device associated with an artist account of the artist, monitoring, by the media content platform over a second time period, consumption of the at least one media content item associated with the artist, by the multiple user accounts, generating second artist data for the artist that describes the consumption of the at least one media content item by the multiple user accounts over the second time period, generating a second recommendation of a second action for increasing the consumption of the at least one media content item based on the artist segment and the second artist data, and outputting the second recommendation in the user interface.

In some aspects, the techniques described herein relate to a method, wherein determining the artist segment includes identifying that consumption of the at least one media content item described by the first artist data satisfies a threshold metric for the artist segment, the threshold metric specifying at least one of a number of streams, a number of active listeners, a number of passive listeners, or a number of new listeners.

In some aspects, the techniques described herein relate to a method, further including determining an estimated budget for the artist based at least in part on profile data for the artist and the artist segment, wherein the first recommendation of the first action is generated based on the estimated budget.

In some aspects, the techniques described herein relate to a method, wherein the second artist data describes at least one demographic group of the multiple user accounts and the second recommendation is generated based on the artist segment for increasing the consumption of the at least one media content item by the at least one demographic group.

In some aspects, the techniques described herein relate to a method, wherein the first recommendation and the second recommendation are generated based on data associated with different artists associated with the artist segment, wherein generating the first recommendation is performed by assigning a first weight to the data associated with the different artists and generating the second recommendation is performed by assigning a second weight to the data associated with the different artists, wherein the second weight is less than the first weight.

In some aspects, the techniques described herein relate to a method, wherein the user interface includes a control that is selectable to export data to a third party platform, the method further including exporting at least one of the first artist data, the activity data, the second artist data, the first recommendation, or the second recommendation to the third party platform responsive to detecting input at the control.

In some aspects, the techniques described herein relate to a method, further including receiving a request to access data for the artist, the request including credentials associated with an originator of the request, and validating the credentials associated with the originator of the request as being associated with an entity authorized by the artist to access the data for the artist, wherein outputting the user interface is performed responsive to validating the credentials.

In some aspects, the techniques described herein relate to a method, further including identifying a role associated with the originator of the request, wherein generating the first recommendation and generating the second recommendation are performed based on the role associated with the originator of the request.

In some aspects, the techniques described herein relate to a method, wherein the first artist data that describes the consumption (claim 19) is a sequence focuses on a scenario where the requestor is associated with a defined role (e.g., tour manager, merchandiser, booking agent, publicist, etc.) and a subset of the artist data is displayed in a user interface, where the subset of the artist data is selected based on the requestor's role (e.g., a merchandiser is presented with information describing what merchandise should be ordered for the artist). At least one action item is identified for the requestor's role, based on data associated with the artist, and a control is configured to initiate performance of the action item on a third-party platform (e.g., book a concert venue, draft and publish a press release, order merchandise, etc.).

In some aspects, the techniques described herein relate to a method including receiving, by a media content platform, a request to access data that describes, for an artist, consumption of at least one media content item associated with an artist, by multiple user accounts, on the media content platform, in response to validating that an originator of the request is authorized to access the data for the artist identifying a role associated with the originator of the request, configuring a user interface that includes a selectable control to initiate performance of an action item identified based on the data for the artist, and displaying the user interface at a computing device, detecting input at the selectable control, and responsive to detecting the input at the selectable control, initiating performance of the action item at a platform other than the media content platform.

In some aspects, the techniques described herein relate to a method, further including receiving feedback from the platform other than the media content platform confirming completion of the action item and updating the data associated with the artist to indicate completion of the action item.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
monitoring, by a media content platform, consumption of at least one media content item associated with an artist, by multiple user accounts, on the media content platform;
generating data for the artist that describes the consumption of the at least one media content item by the multiple user accounts;
receiving a request to access the data for the artist, the request including credentials associated with an originator of the request;
validating that the credentials associated with the originator of the request are associated with an entity authorized by the artist to access the data for the artist; and
in response to validating that the originator of the request is authorized to access the data for the artist:
identifying a role associated with the originator of the request;
configuring a user interface that presents a subset of the data for the artist based on the role associated with the originator of the request and includes at least one action item to be performed based on the subset of the data; and
displaying the user interface at a computing device.

2. The method of claim 1, further comprising:
receiving a different request to access the data for the artist, the request including different credentials associated with an originator of the different request;
in response to validating that the originator of the different request is authorized to access the data for the artist:
identifying a role associated with the originator of the different request;
configuring a different user interface that presents a different subset of the data for the artist based on the role associated with the originator of the different request and includes at least one other action item to be performed based on the different subset of the data; and
displaying the different user interface at a computing device.

3. The method of claim 1, wherein configuring the user interface includes generating a selectable control for the at least one action item to be performed based on the subset of the data and initiating performance of the at least one action item in response to detecting input at the selectable control.

4. The method of claim 3, wherein initiating performance of the at least one action item comprises initiating performance of an action on a platform other than the media content platform.

5. The method of claim 3, wherein the role associated with the originator of the request comprises a booking agent and the at least one action item comprises booking a venue for the artist, wherein the venue is identified by the media content platform based on the data for the artist.

6. The method of claim 3, wherein the role associated with the originator of the request comprises a manager and the at least one action item comprises increasing an inventory of goods for the artist, wherein a type of the goods is recommended by the media content platform based on the data for the artist.

7. The method of claim 1, further comprising receiving input at the user interface requesting refinement of the subset of the data for the artist derived from a portion of the multiple user accounts sharing a characteristic and updating the user interface to display a portion of the subset of the data for the artist derived from the portion of the multiple user accounts sharing the characteristic.

8. The method of claim 1, further comprising:
receiving an indication that the at least one action item was performed; and
modifying the user interface to display at least one insight describing how performance of the at least one action item affected consumption of the at least one media content item associated with the artist.

9. The method of claim 1, wherein the at least one action item is to be performed is further identified based on data obtained from a platform other than the media content platform.

10. A method comprising:
monitoring, by a media content platform over a first time period, consumption of at least one media content item associated with an artist, by multiple user accounts, on the media content platform;
generating first artist data for the artist that describes the consumption of the at least one media content item by the multiple user accounts over the first time period;
receiving, by the media content platform, activity data associated with at least one activity performed by the artist;
determining an artist segment to associate with the artist based on the first artist data and the activity data;
generating a first recommendation of a first action for the artist to take to increase the consumption of the at least one media content item based on the artist segment;
outputting the first recommendation in a user interface by a device associated with an artist account of the artist;
monitoring, by the media content platform over a second time period, consumption of the at least one media content item associated with the artist, by the multiple user accounts;
generating second artist data for the artist that describes the consumption of the at least one media content item by the multiple user accounts over the second time period;
generating a second recommendation of a second action for increasing the consumption of the at least one media content item based on the artist segment and the second artist data; and
outputting the second recommendation in the user interface.

11. The method of claim 10, wherein determining the artist segment comprises identifying that consumption of the at least one media content item described by the first artist data satisfies a threshold metric for the artist segment, the threshold metric specifying at least one of a number of streams, a number of active listeners, a number of passive listeners, or a number of new listeners.

12. The method of claim 10, further comprising determining an estimated budget for the artist based at least in part on profile data for the artist and the artist segment, wherein the first recommendation of the first action is generated based on the estimated budget.

13. The method of claim 10, wherein the second artist data describes at least one demographic group of the multiple user accounts and the second recommendation is generated based on the artist segment for increasing the consumption of the at least one media content item by the at least one demographic group.

14. The method of claim 10, wherein the first recommendation and the second recommendation are generated based on data associated with different artists associated with the artist segment, wherein generating the first recommendation is performed by assigning a first weight to the data associated with the different artists and generating the second recommendation is performed by assigning a second weight to the data associated with the different artists, wherein the second weight is less than the first weight.

15. The method of claim 10, wherein the user interface includes a control that is selectable to export data to a third party platform, the method further comprising exporting at least one of the first artist data, the activity data, the second artist data, the first recommendation, or the second recommendation to the third party platform responsive to detecting input at the control.

16. The method of claim 10, further comprising:
receiving a request to access data for the artist, the request including credentials associated with an originator of the request; and
validating the credentials associated with the originator of the request as being associated with an entity authorized by the artist to access the data for the artist, wherein outputting the user interface is performed responsive to validating the credentials.

17. The method of claim 16, further comprising identifying a role associated with the originator of the request, wherein generating the first recommendation and generating the second recommendation are performed based on the role associated with the originator of the request.

18. The method of claim 10, wherein the first artist data that describes the consumption of the at least one media content item includes information describing a number of active consumers of the at least one media content item during the first time period and a number of passive consumers of the at least one media content item during the first time period, wherein the user interface includes a display of information describing the number of active consumers and the number of passive consumers.

19. A method comprising:
receiving, by a media content platform, a request to access data that describes, for an artist, consumption of at least one media content item associated with an artist, by multiple user accounts, on the media content platform;
in response to validating that an originator of the request is authorized to access the data for the artist:
identifying a role associated with the originator of the request;
configuring a user interface that includes a selectable control to initiate performance of an action item identified based on the data for the artist; and
displaying the user interface at a computing device;
detecting input at the selectable control; and
responsive to detecting the input at the selectable control, initiating performance of the action item at a platform other than the media content platform.

20. The method of claim 19, further comprising receiving feedback from the platform other than the media content platform confirming completion of the action item and updating the data associated with the artist to indicate completion of the action item.

* * * * *